United States Patent [19]
Dumond et al.

[11] Patent Number: 5,280,536
[45] Date of Patent: Jan. 18, 1994

[54] METHOD AND APPARATUS FOR SUPPLYING PULSED POWER TO AN OPHTHALMIC LASER SYSTEM

[75] Inventors: Gregory Dumond, Santa Clara; Robert J. Rorden, Los Altos; Ralph Saunders, San Jose, all of Calif.

[73] Assignee: Coherent, Inc., Palo Alto, Calif.

[21] Appl. No.: 775,813

[22] Filed: Oct. 11, 1991

[51] Int. Cl.[5] ............................................. H01S 3/097
[52] U.S. Cl. ........................................ 372/82; 372/38
[58] Field of Search .................................. 372/82, 38

[56] References Cited
U.S. PATENT DOCUMENTS

| | | | |
|---|---|---|---|
| 4,308,507 | 12/1981 | Pleasance et al. | 372/82 |
| 4,648,093 | 3/1987 | Sasnett et al. | 372/82 |
| 4,811,188 | 3/1989 | Bees | 372/82 |
| 4,908,524 | 3/1990 | Sojka | 372/82 |
| 4,937,834 | 6/1990 | Egawa | 372/82 |
| 4,945,542 | 7/1990 | Brothers | 372/82 |
| 5,008,894 | 4/1991 | Laakman | 372/82 |
| 5,048,033 | 9/1991 | Donahue et al. | 372/38 |

*Primary Examiner*—Rodney B. Bovernick
*Assistant Examiner*—Robert E. Wise
*Attorney, Agent, or Firm*—Limbach & Limbach

[57] ABSTRACT

A laser power supply including circuitry for converting standard, 115-120 volt, AC power from a wall outlet to current pulses for powering a laser, to generate a pulsed laser output beam having laser pulse amplitude and duration matching pre-selected parameters. In a preferred embodiment, the invention powers an argon laser tube and generates output laser beam pulses having power in the range from about 50 milliwatts to 2 watts, and duration in the range from about 0.01 second to 2 seconds. The invention converts standard AC power to current pulses having controlled duration, average amplitude, and ripple amplitude for powering a laser, and can produce laser output beam pulses with a turn-on time of less than 1 millisecond, with a switching frequency in the range from about 10 to 20 KHz without significant overshoot. A preferred embodiment of the invention powers a gas laser tube, and includes a magnet control circuit which enables the laser tube magnet in the absence of a special magnet control signal received at the magnet control circuit from a fiber optic link. The invention is particularly suitable for powering gas laser systems for use in ophthalmic and surgical applications, but is also useful for powering other types of laser systems. An important advantage of the invention is that its ability to accept standard, AC power from a wall outlet enables the inventive apparatus to be moved conveniently between treatment rooms (for use in any of the rooms), without the expense and inconvenience of installing special wiring.

22 Claims, 21 Drawing Sheets

SWITCHING LIGHT REGULATOR

SWITCH CONTROL CIRCUIT 8

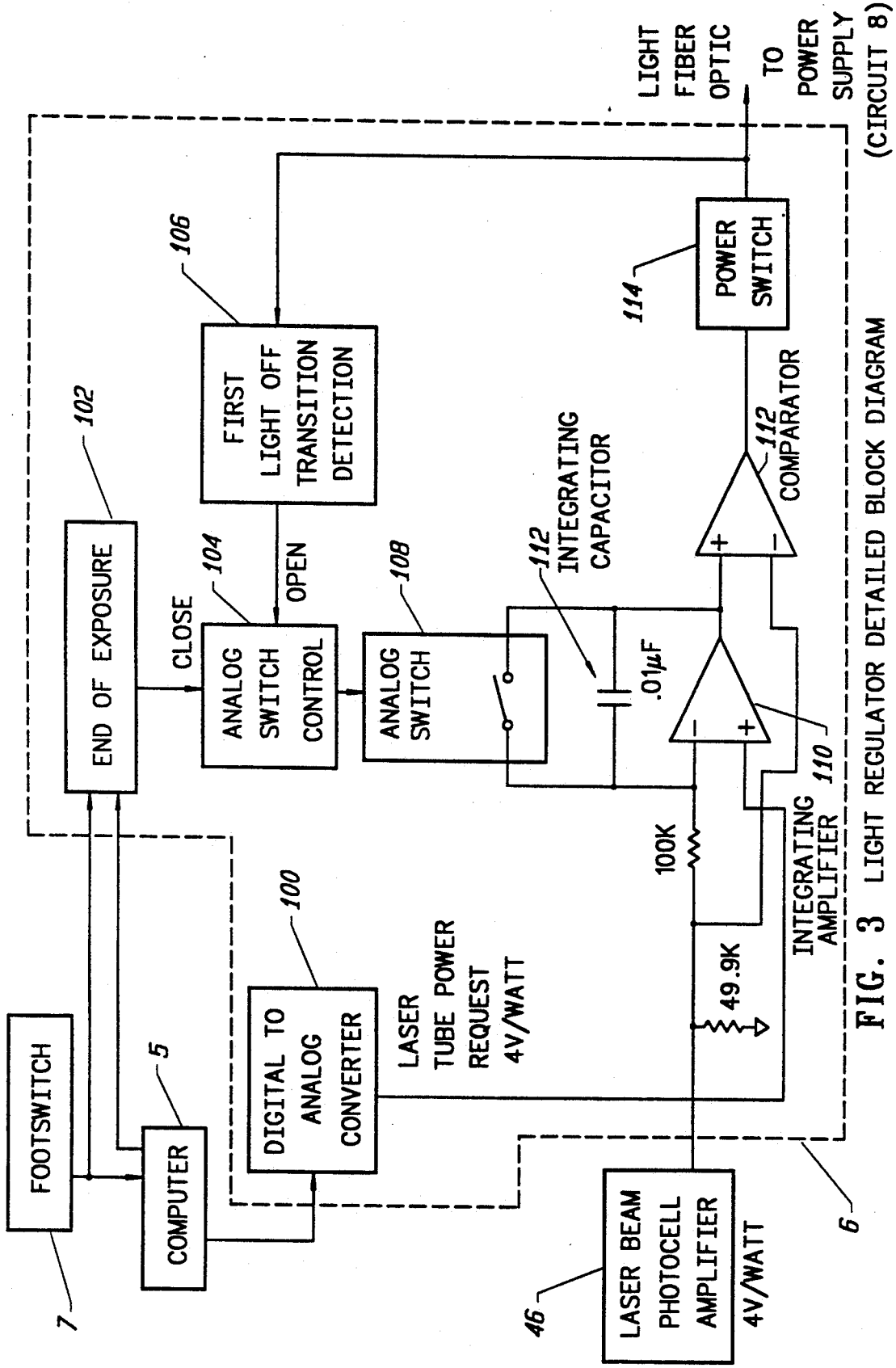
FIG. 3 LIGHT REGULATOR DETAILED BLOCK DIAGRAM

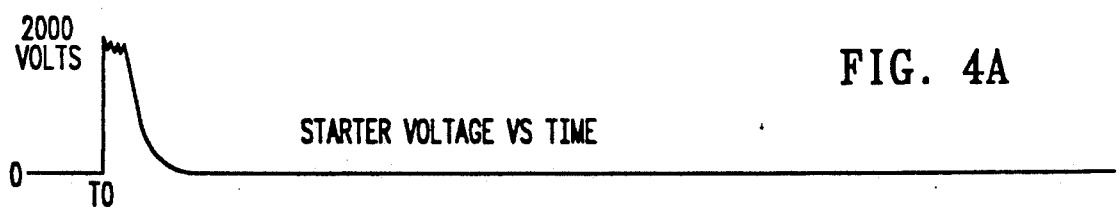
FIG. 4A STARTER VOLTAGE VS TIME
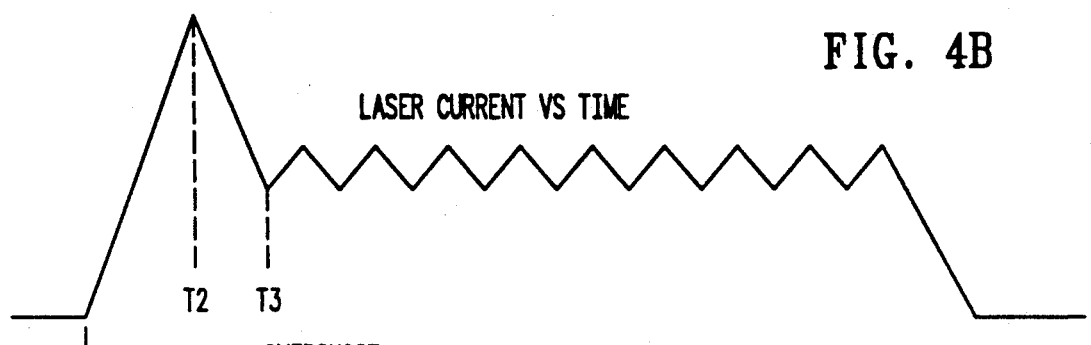
FIG. 4B LASER CURRENT VS TIME
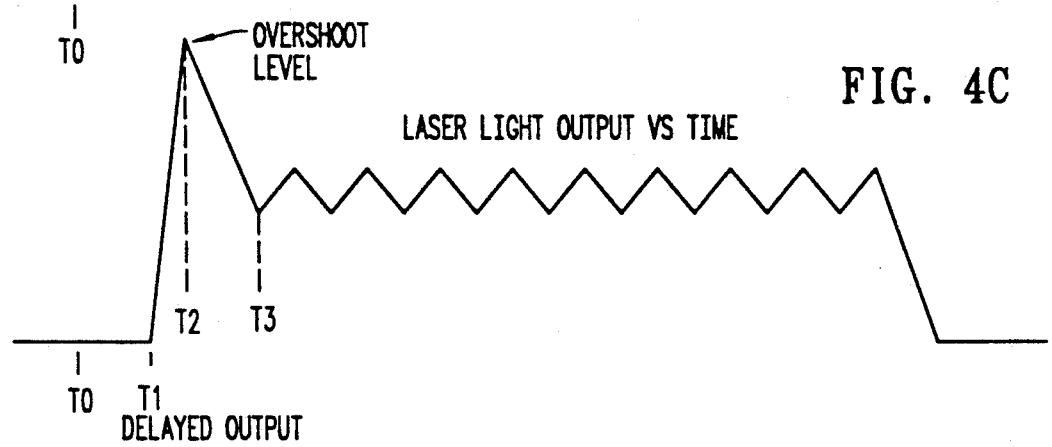
FIG. 4C LASER LIGHT OUTPUT VS TIME
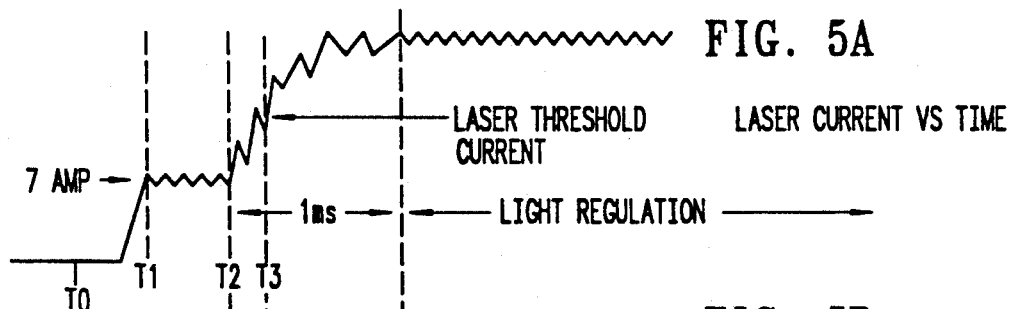
FIG. 5A LASER CURRENT VS TIME
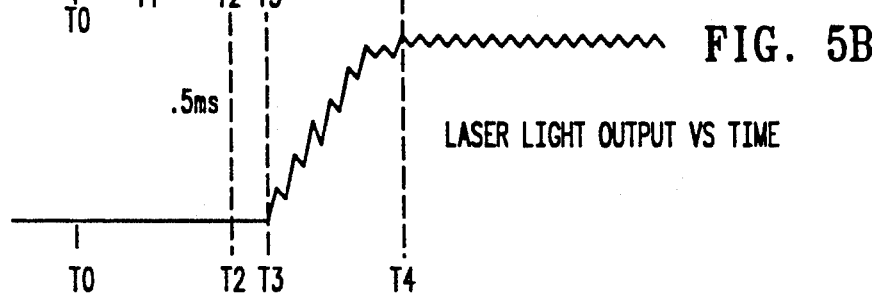
FIG. 5B LASER LIGHT OUTPUT VS TIME

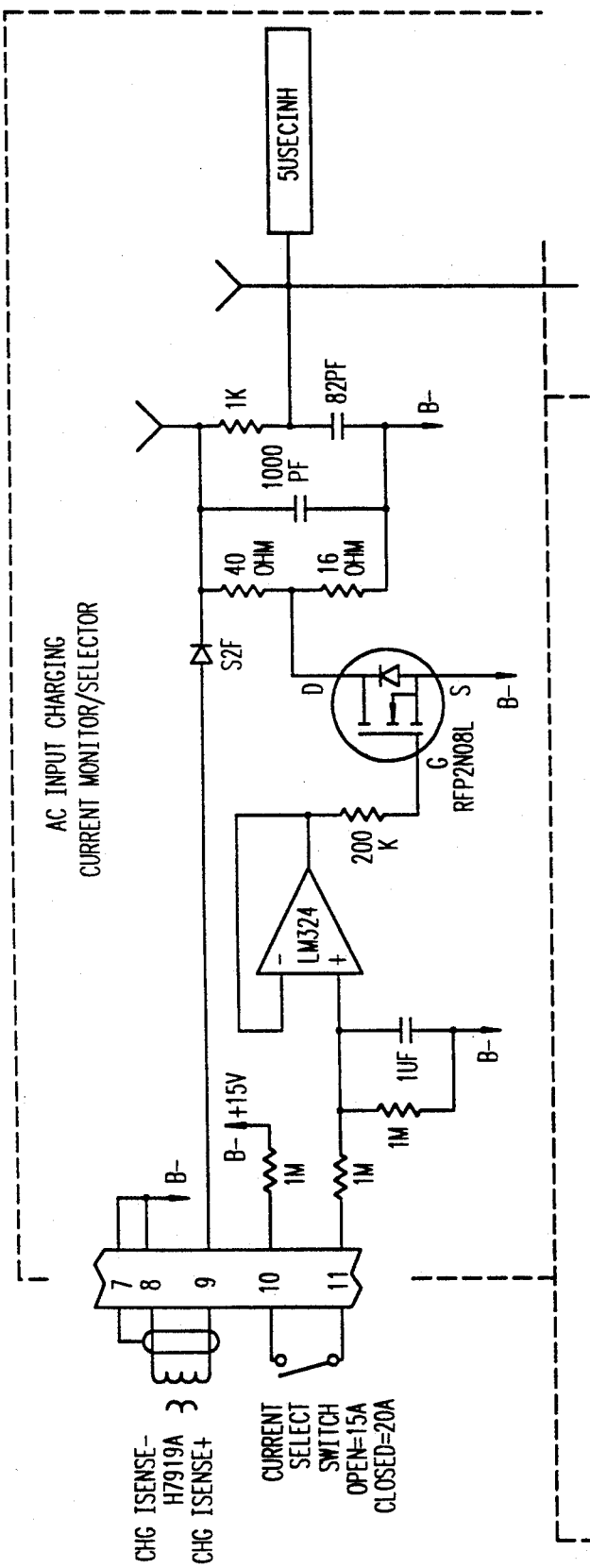
FIG. 7A1

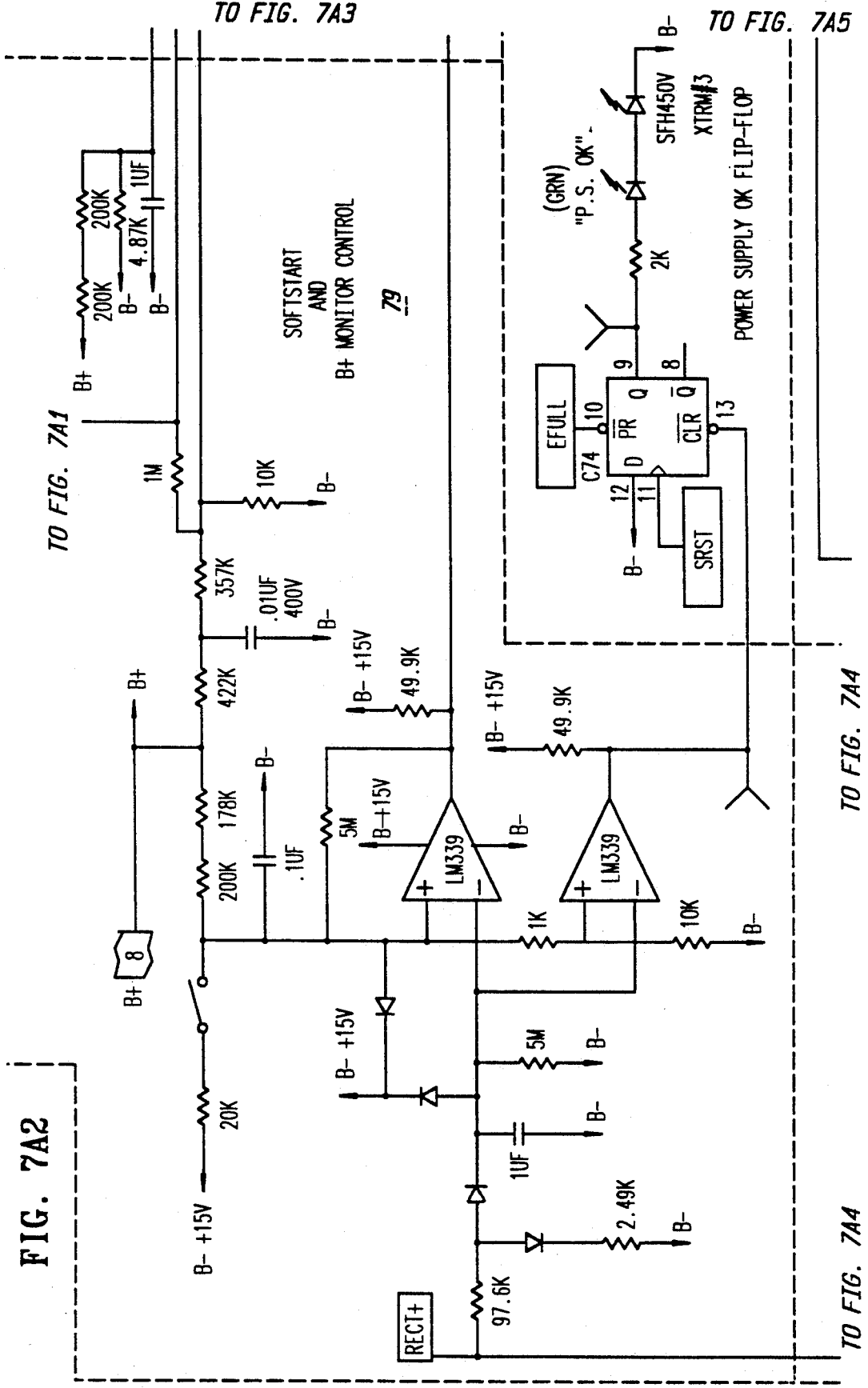

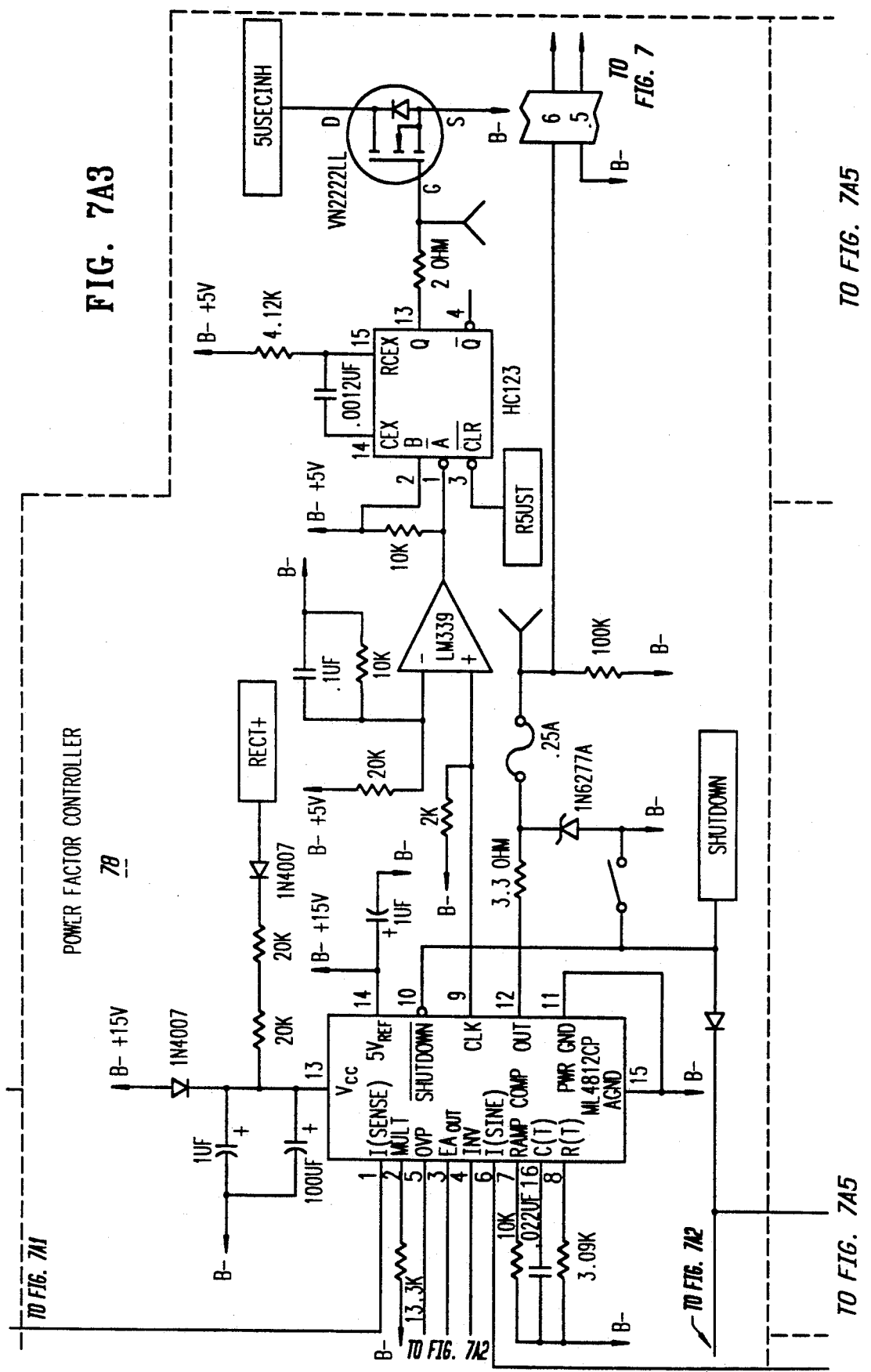
FIG. 7A3

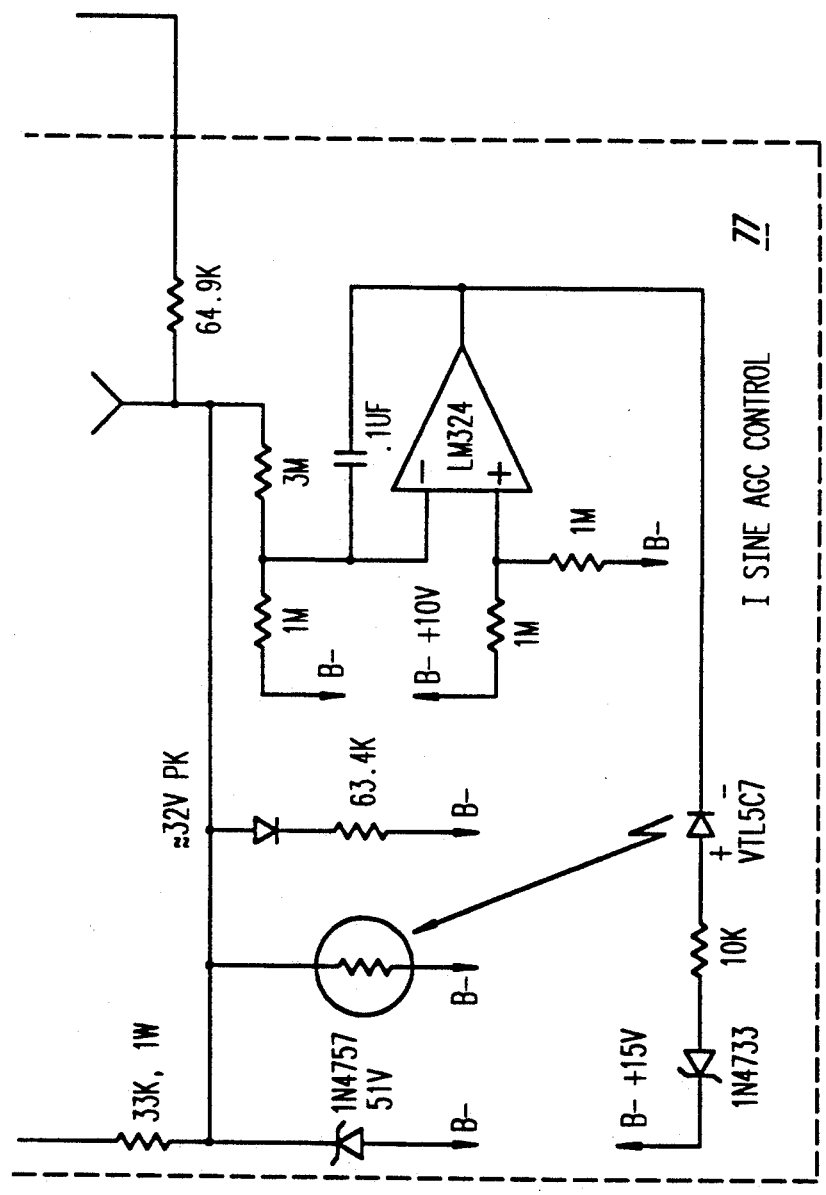
FIG. 7A4

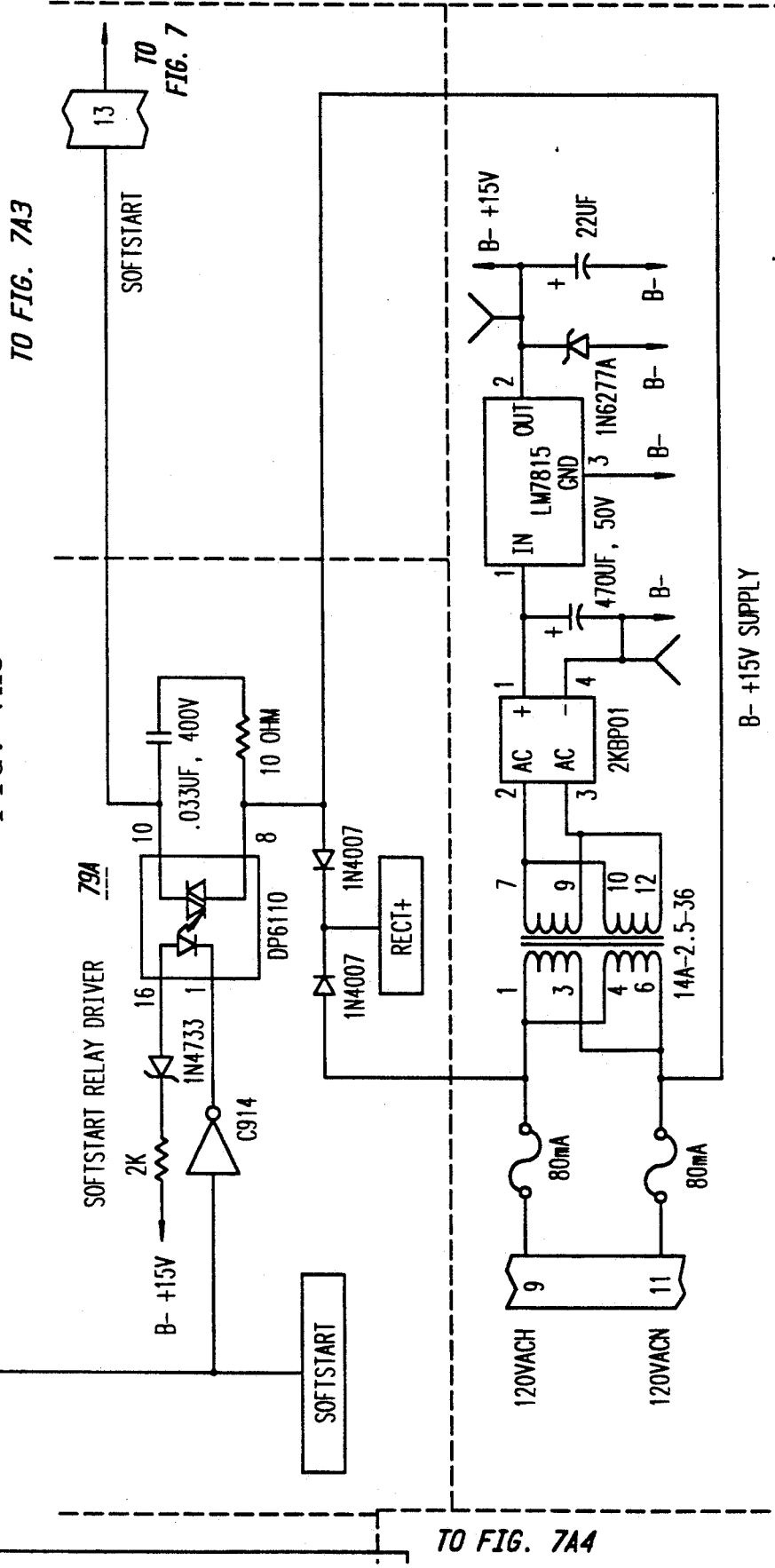
FIG. 7A5

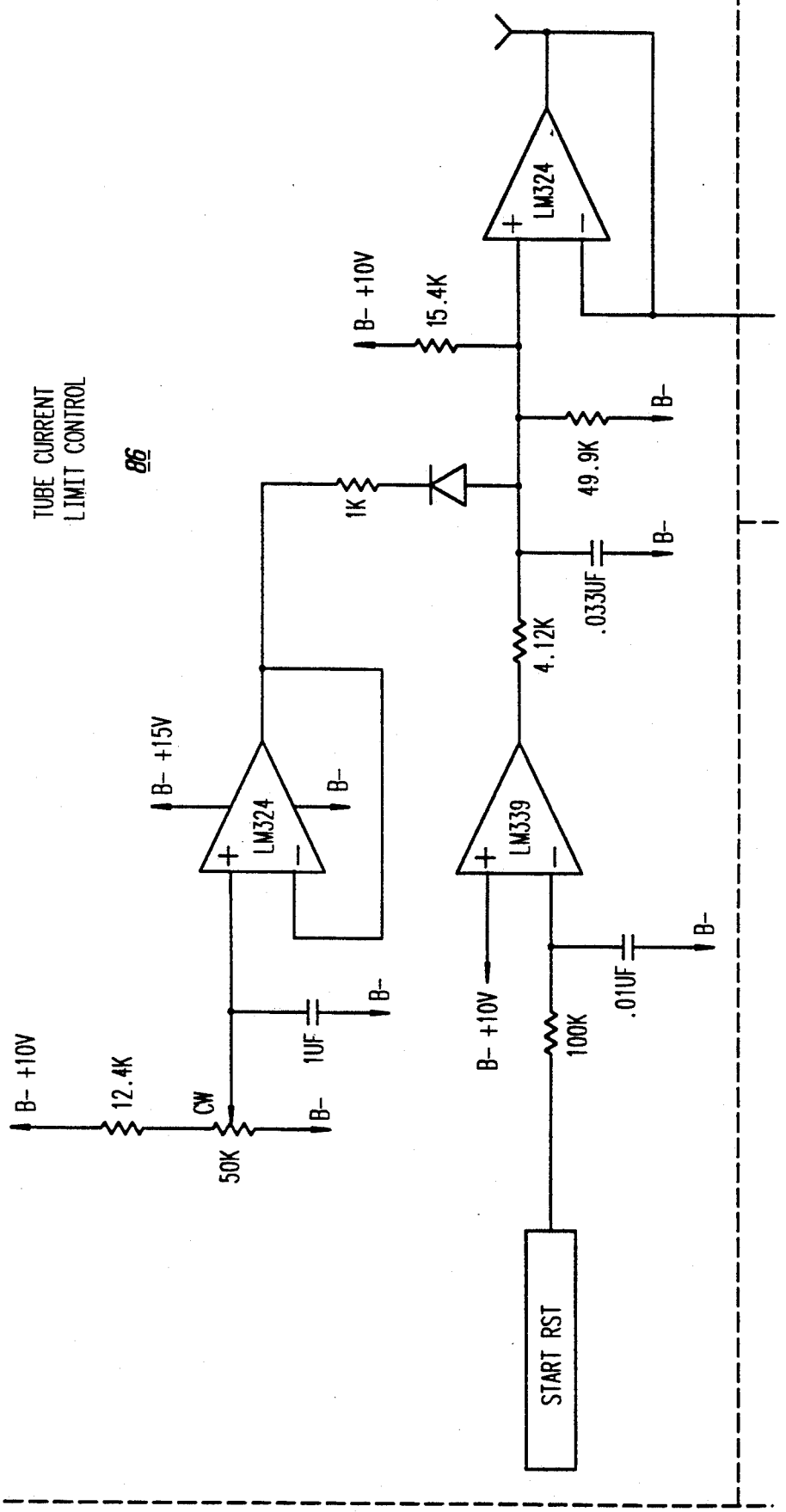
FIG. 8A1

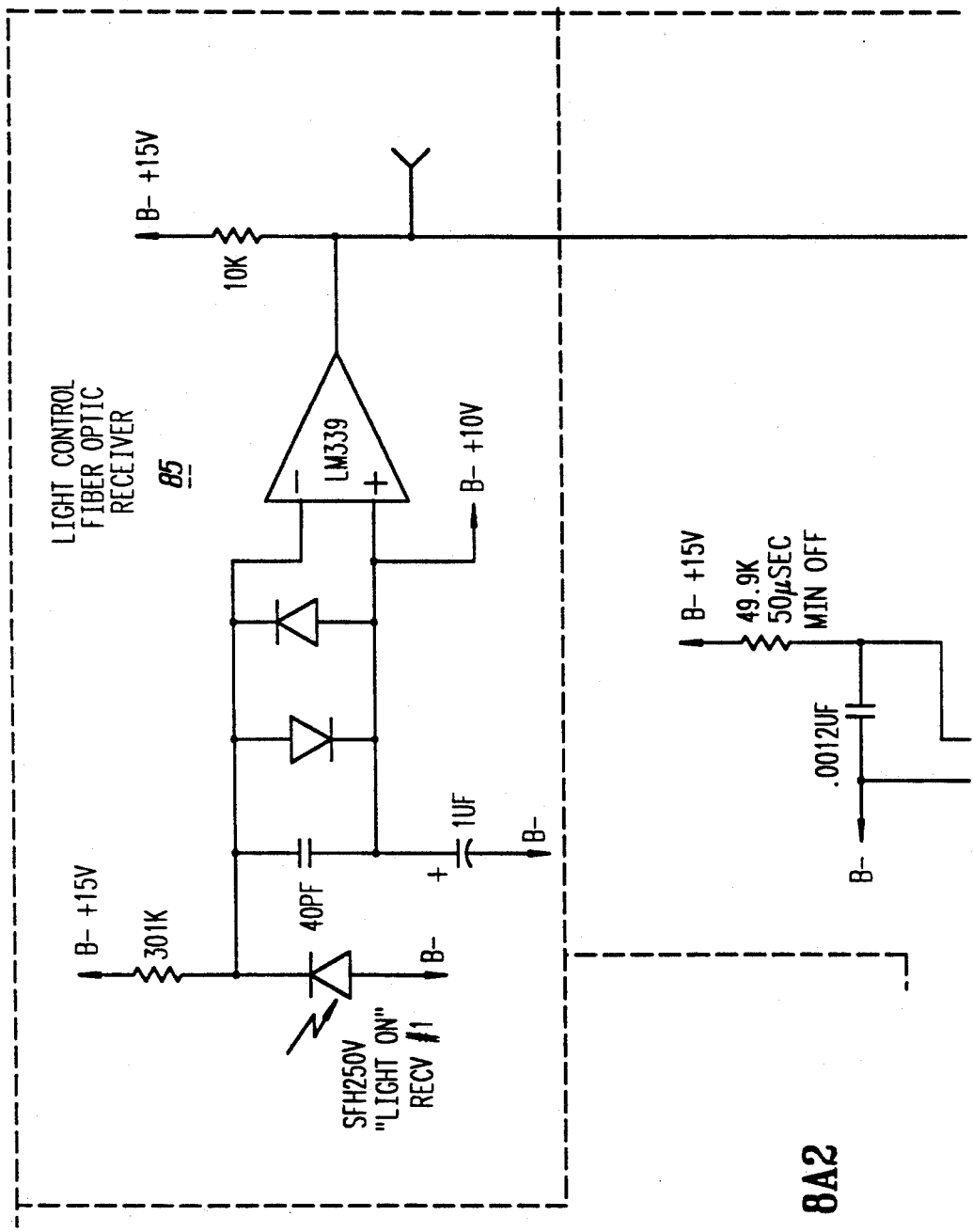
FIG. 8A2

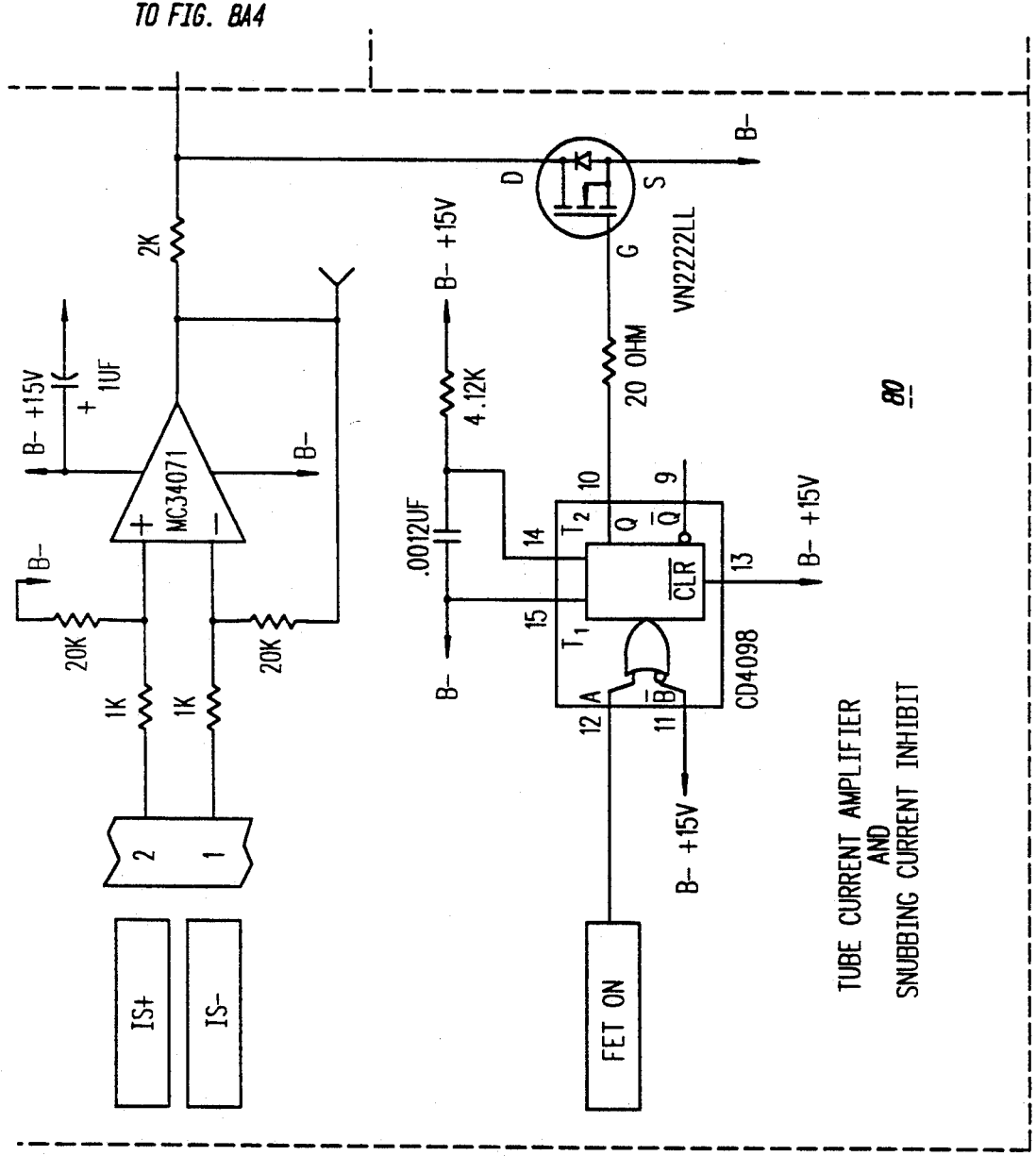
FIG. 8A3

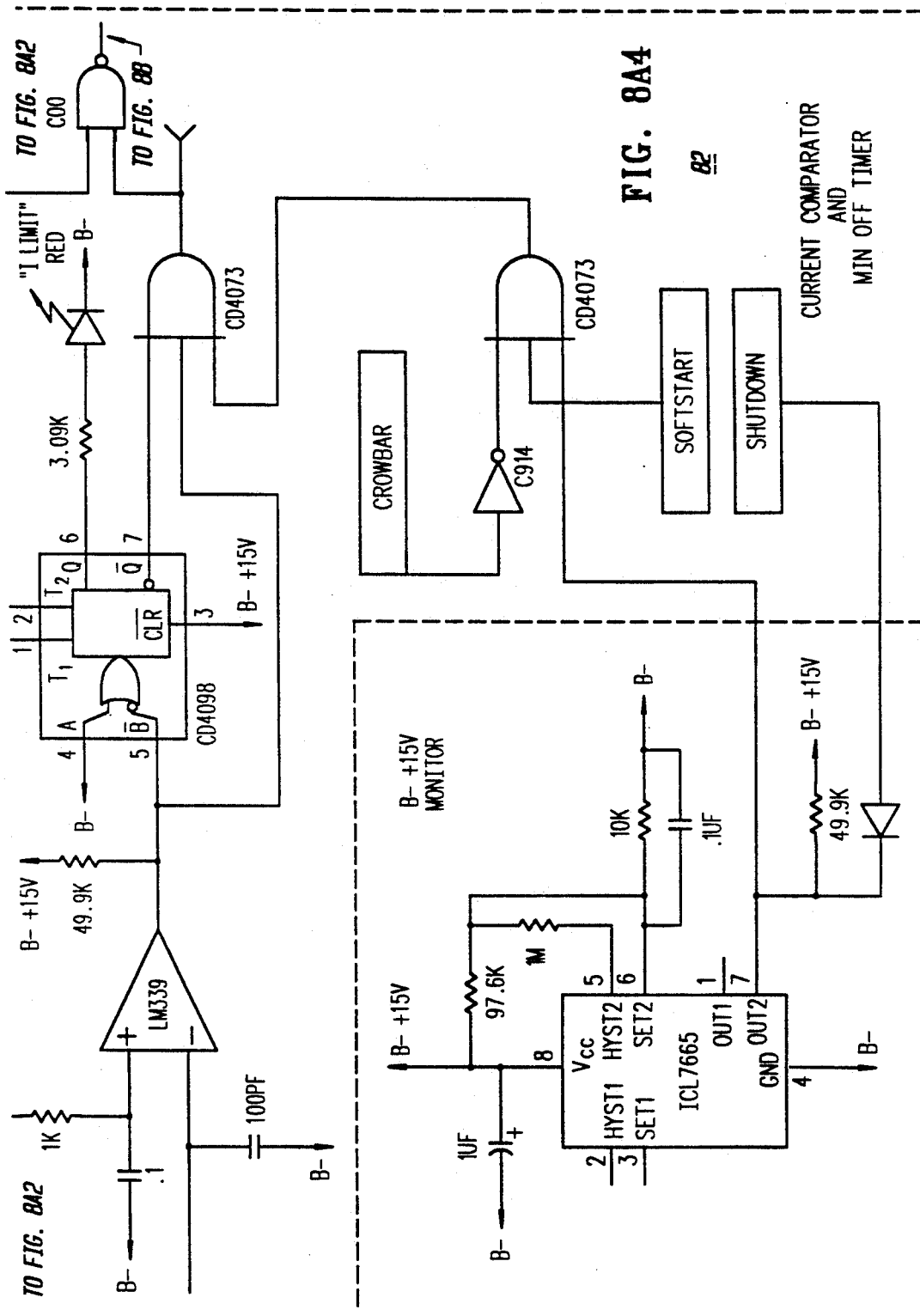
FIG. 8A4
CURRENT COMPARATOR AND MIN OFF TIMER

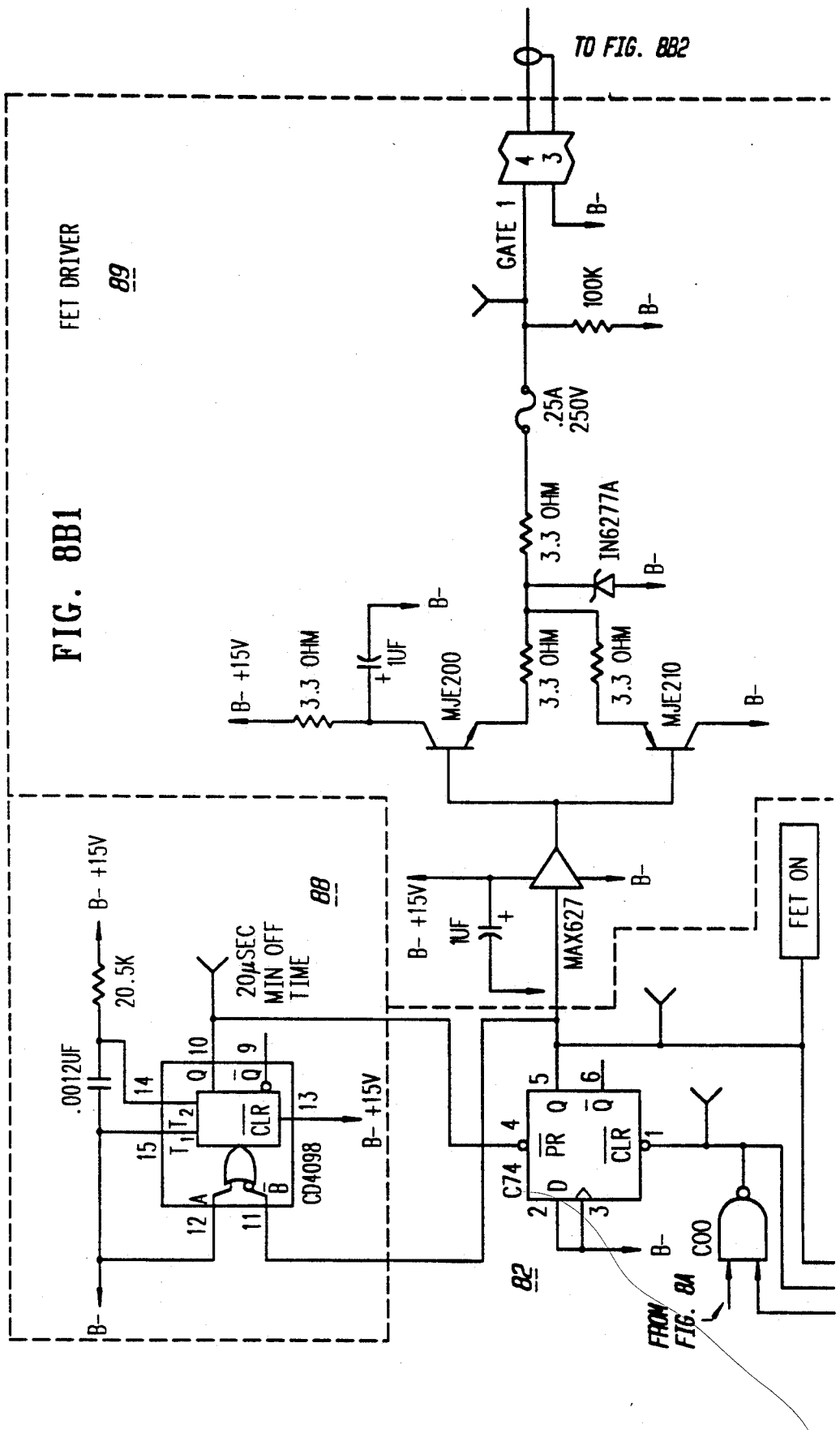
FIG. 8B1

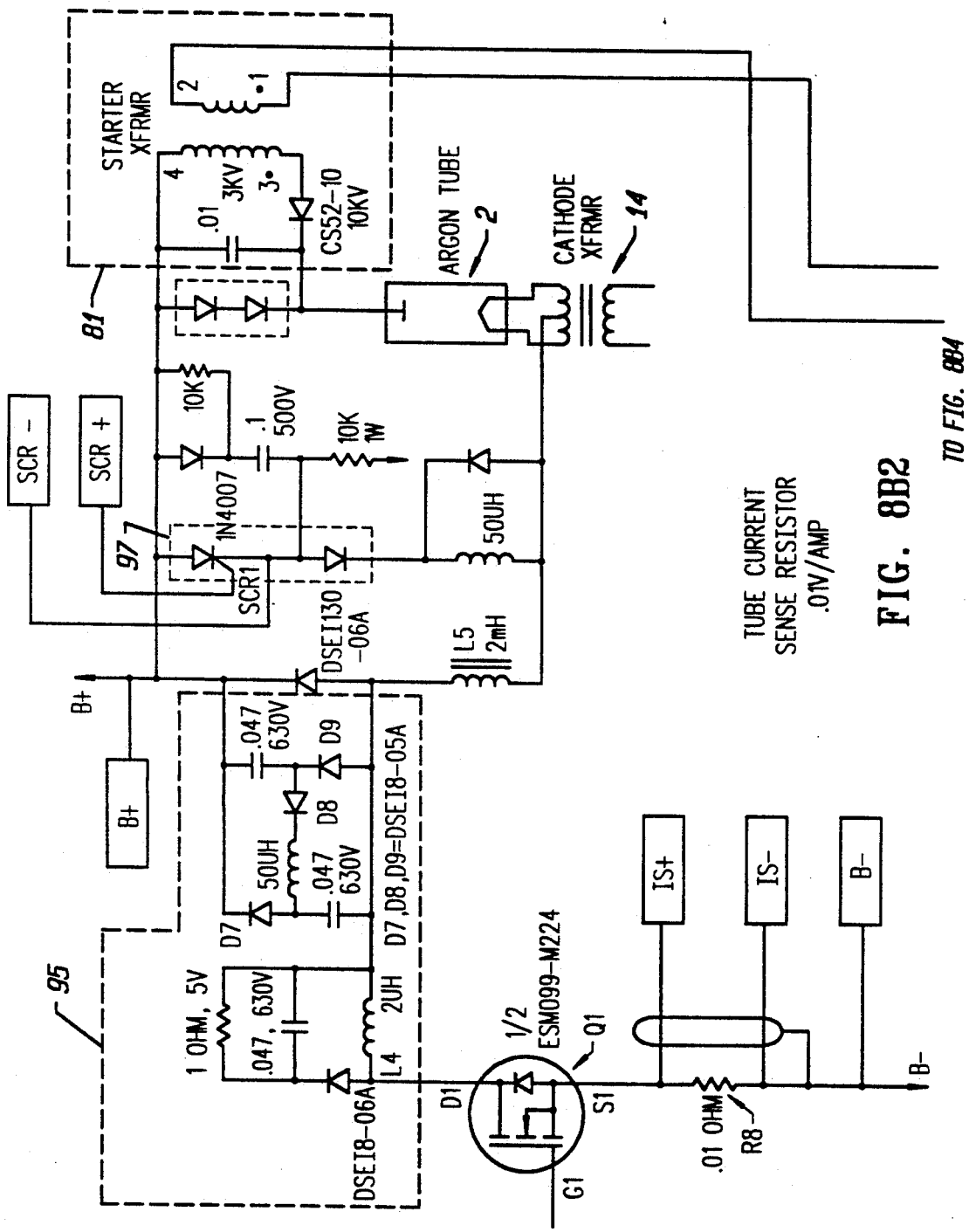
FIG. 8B2

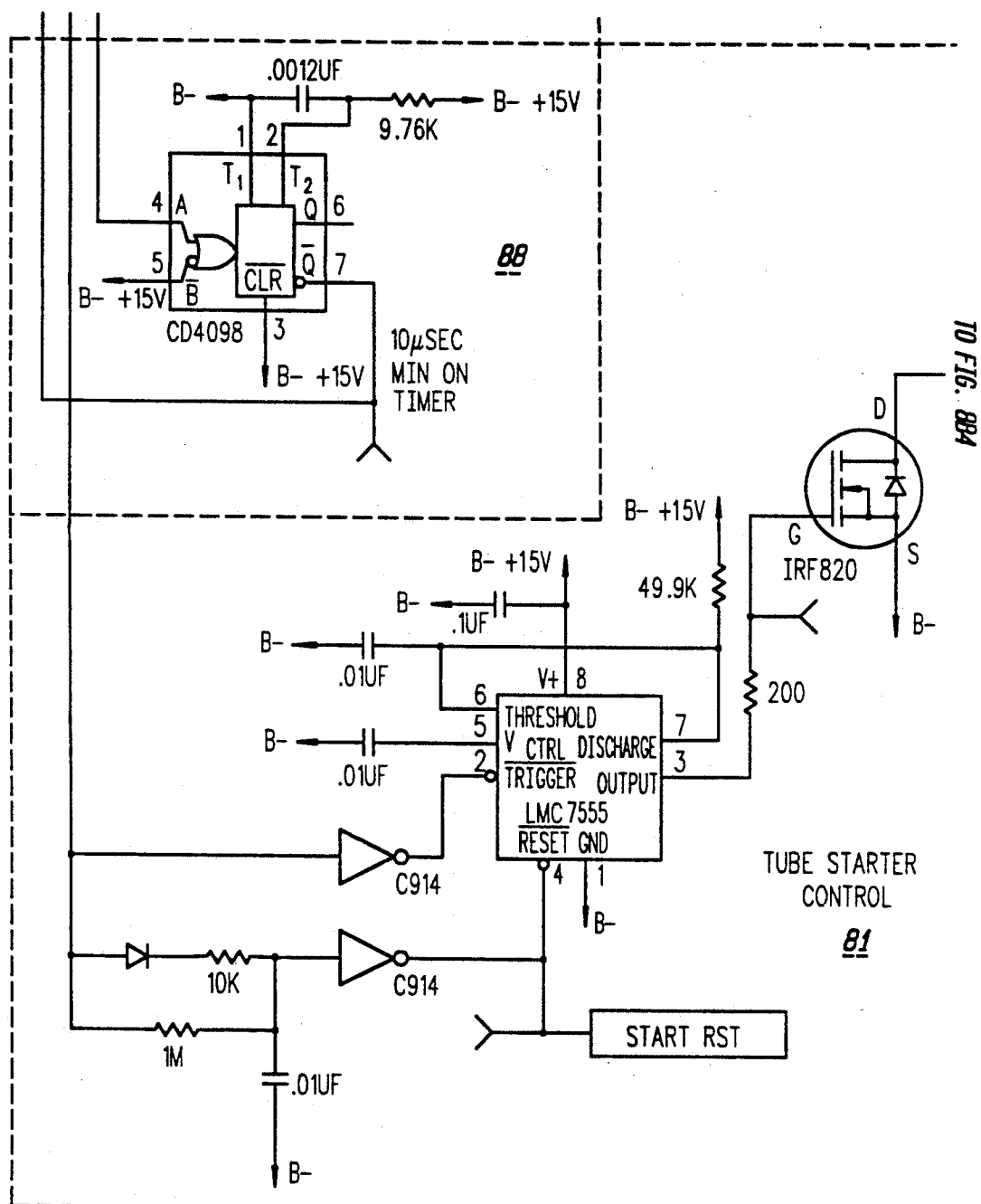
FIG. 8B3

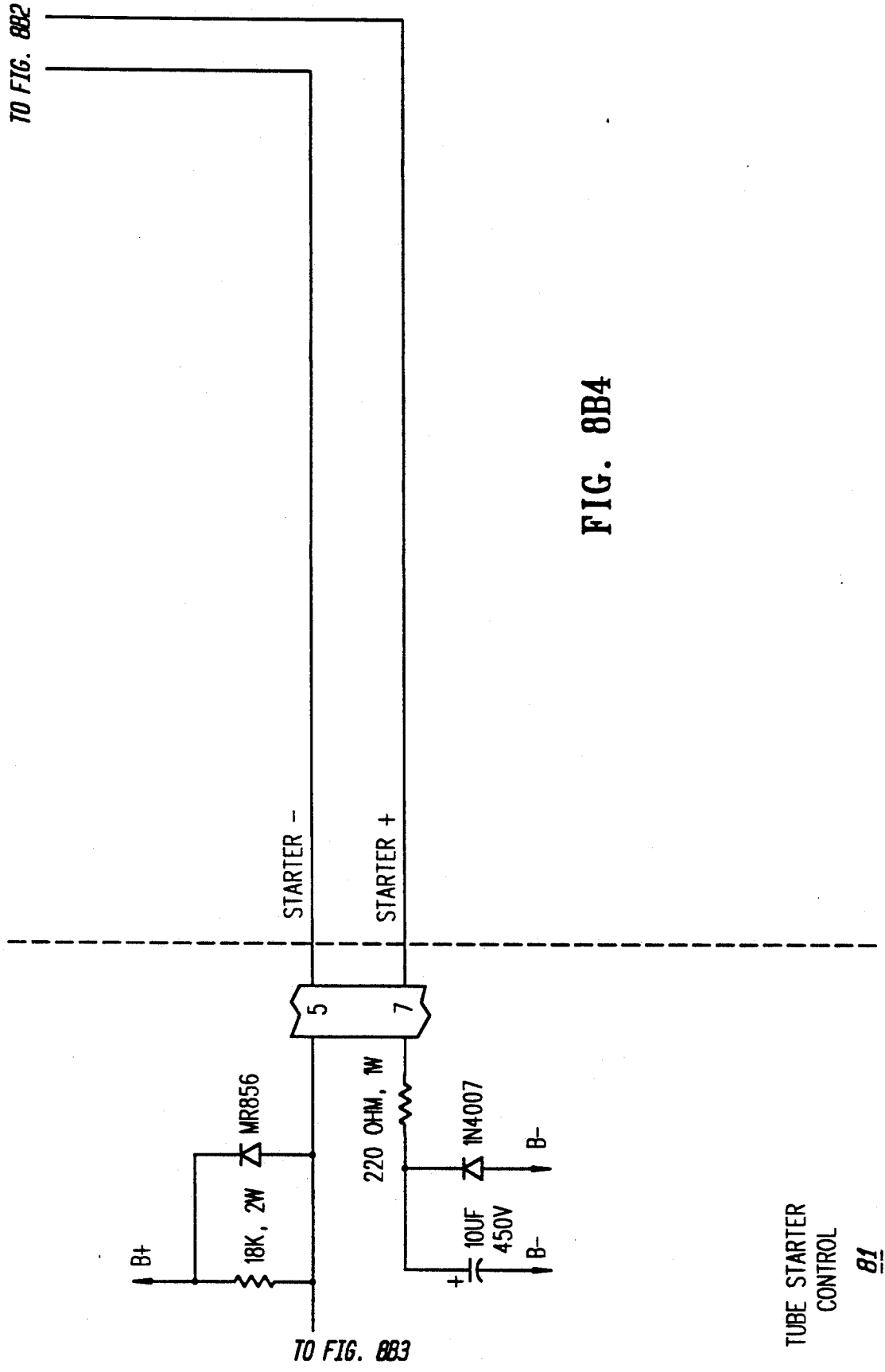

METHOD AND APPARATUS FOR SUPPLYING PULSED POWER TO AN OPHTHALMIC LASER SYSTEM

FIELD OF THE INVENTION

The invention relates to methods and apparatus for supplying power to electronically pulsed laser systems. In a preferred embodiment, the invention electronically converts standard AC power from a wall outlet into power pulses for an electronically pulsed laser system of the type useful for ophthalmic or other medical applications.

BACKGROUND OF THE INVENTION

It is conventional to employ continuous wave laser systems for ophthalmic surgery and other medical applications. However, conventional continuous wave laser systems have produced large amounts of waste heat when used in such applications, and for this reason have employed external cooling water supplies (or other external cooling means) to dissipate waste heat.

Some conventional continuous wave laser systems have employed mechanical shuttering devices in the laser beam path to convert the laser output beam mechanically into a pulsed output beam. However, such mechanical shuttering devices are slow, and typically produce audible clicking noises whenever the user actuates the system, which undesirably tends to cause the patient being treated to flinch.

The present invention employs electronic switching to produce a pulsed laser output beam (for ophthalmic and other medical applications) in a silent and efficient manner, without moving mechanical parts, and in a manner reducing the laser system's duty cycle (and hence the time-averaged heat generated by the system). The inventive electronic pulsing circuitry is also much faster (i.e., results in much shorter pulse rise times) than mechanical beam chopping means. Furthermore, the inventive electronic pulsing technique allows the laser system to operate with a self-contained, internal cooling means, so that the system does not require external water connections and is portable.

Another important advantage of the electronic pulsing circuitry of the invention is that it accepts standard, 115-120 volt, AC power from a wall outlet, and converts such standard power to a pulse (having controlled duration and amplitude) for powering a laser. The ability to accept power from a standard wall outlet is useful, in that it enables the inventive apparatus to be moved conveniently between treatment rooms (for use in any of the rooms), without the expense and inconvenience of installing special wiring.

SUMMARY OF THE INVENTION

The laser power supply of the invention includes circuitry for modulating the power supplied to a laser in order to generate a pulsed laser output beam having laser pulse amplitude and duration matching preselected parameters. In a preferred embodiment, the inventive system powers an argon laser tube and generates output laser beam pulses having power in the range from about 50 milliwatts to 2 watts, and duration in the range from about 0.01 second to 2 seconds.

The electronic power supply of the invention accepts standard, 115-120 volt, AC power from a wall outlet, and converts such standard AC power to pulses (having controlled duration, average amplitude, and ripple amplitude) for powering a laser. The invention can produce light regulated output beam pulses with a turn-on time of less than 1 millisecond, and with a switching frequency in the range from about 10 to 20 KHz without significant overshoot.

A preferred embodiment of the invention employs a gas laser tube to generate the output laser beam, and includes a magnet control circuit which enables the laser tube magnet in the absence of a special magnet control signal received at the magnet control circuit from a fiber optic link, in order to promptly discharge energy stored in the power supply when the system is turned off.

The invention is particularly suitable for powering gas laser systems for use in ophthalmic and surgical applications, but is also useful for powering other types of laser systems.

BRIEF DESCRIPTION OF THE DRAWINGS

FIG. 3 is a block diagram of the light regulator circuit of the FIG. 1 embodiment.

FIG. 4 is a set of three graphs (identified as FIGS. 4A, 4B, and 4C, respectively) representing voltage, current, and laser output power signals generated in one operating mode of the inventive system.

FIG. 5 is a set of two graphs (identified as FIGS. 5A, and 5B, respectively) representing voltage and current signals generated in a preferred operating mode of the inventive system.

FIG. 7A (comprising FIGS. 7A1 through 7A5) is a schematic diagram of a preferred implementation of a second portion of the FIG. 1 system.

FIG. 8A (comprising FIGS. 8A1 through 8A4) is a schematic diagram of a preferred implementation of a third portion of the FIG. 1 system.

FIG. 8B (comprising FIGS. 8B1 through 8B4) is a schematic diagram of a preferred implementation of a fourth portion of the FIG. 1 system.

DETAILED DESCRIPTION OF THE PREFERRED EMBODIMENTS

A preferred embodiment of the system of the invention will first be described with reference to FIGS. 1, 2, 3, and 6. The system of FIG. 1 includes a ceramic/tungsten argon laser tube 2, which emits an output beam 3 when appropriately powered. A principal portion of the power spectrum of beam 3 is within a wavelength range suitable for ophthalmic surgical applications.

Figure 1:
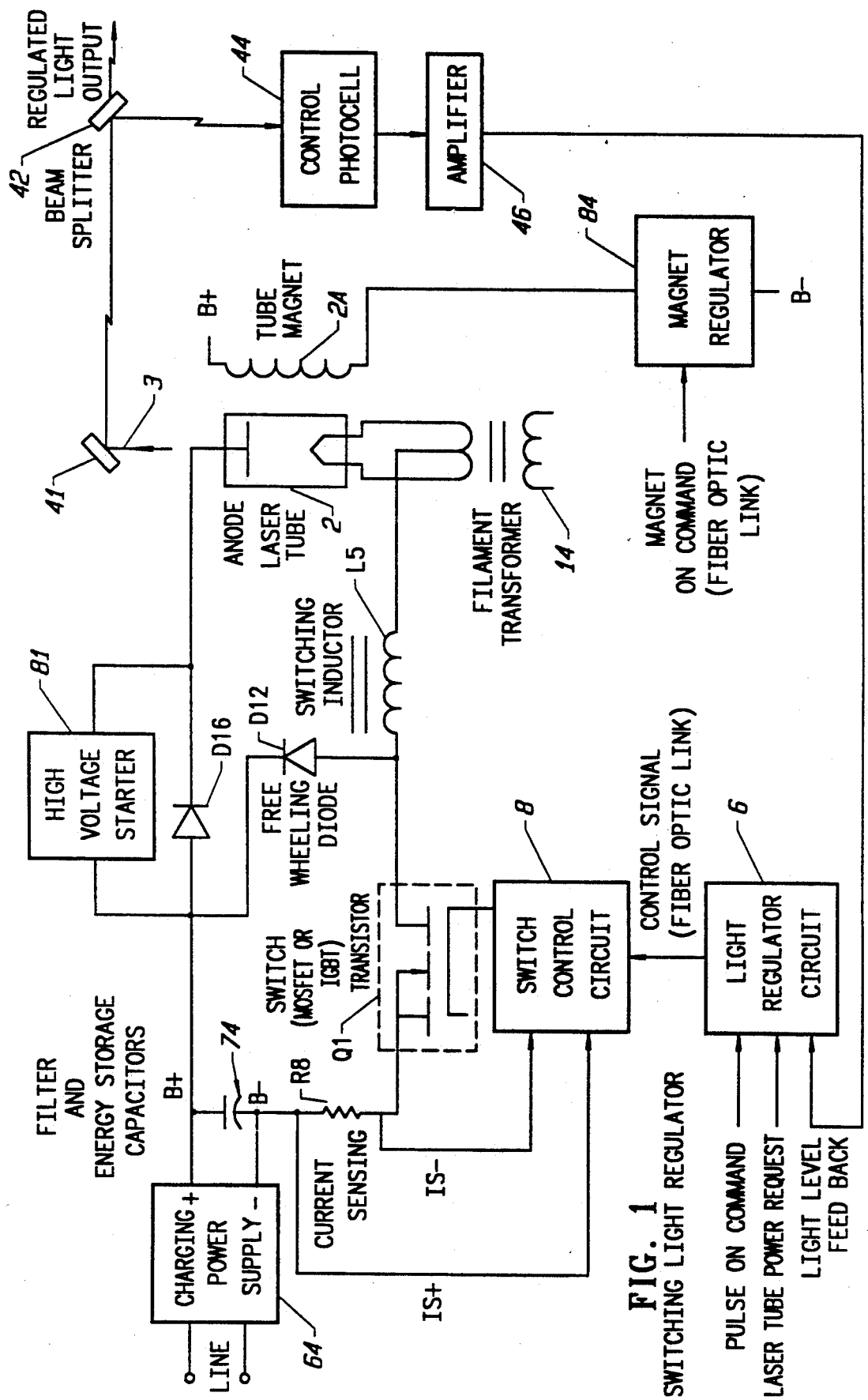
FIG. 1 is a block diagram of a preferred embodiment of the invention.

In alternative embodiments, any of a variety of laser media can be substituted for argon laser tube 2 employed in the FIG. 1 embodiment. The invention can include a laser capable of continuous wave ("CW") operation, or a laser (for example, a diode laser) not capable of CW operation.

In response to a control signal supplied through a fiber optic link from light regulator circuit 6 (to trigger production of a laser beam pulse), switch control circuit 8 asserts a control signal to switching transistor Q1, thereby turning on transistor Q1 and causing tube start circuit ("tube pulse starter") 81 to provide a high voltage pulse to the anode of tube 2 sufficient to ionize the medium within the tube (a preferred embodiment of circuit 81 is shown in FIG. 8B). Also in response to a control signal supplied through a fiber optic link (for example, from light regulator circuit 6), magnet control circuit 84 causes a desired current to flow through magnet 2a which surrounds tube 2. When switching transistor Q1 is "on," and sufficient voltage has been developed across capacitor circuit 74 (in a manner to be described below), an increasing current will flow from capacitor 74, through diode D16 and the anode of laser tube 2, to the cathode of laser tube 2 (this current will increase approximately linearly with time). Laser beam 3 appears when the current flow through tube 2 (from the cathode to the anode thereof) rises to the laser threshold value, and the power of beam 3 will increase as the current through tube 2 increases above the laser threshold value.

The control signals are preferably asserted in a preferred sequence (to be described below with reference to FIG. 5), to initiate a laser pulse in a manner which accommodates the phenomenon of laser gas pumping within tube 2.

Switching transistor Q1 is preferably a power MOSFET, but can alternatively be of another type such as the IGBT type.

Laser tube cathode heater 14 shown in FIG. 1 preferably includes a ferro-resonant filament transformer whose primary winding is connected to an AC power source (not shown), and whose secondary winding supplies a lower AC voltage (typically 3 VAC, at 25 amps) to the cathode of tube 2.

After a laser output pulse has been initiated, the laser beam 3 output from laser tube 2 is directed by mirror 41 to beam splitter 42 (a partially reflective mirror). Beam splitter 42 diverts a portion of laser beam 3 to photodetector 44. Amplifier 46 amplifies the resulting electrical output signal from photodetector 44, and supplies the amplified signal to circuit 6.

Light regulator 6 includes a comparator which compares the signal received by circuit 6 from amplifier 46 (which signal is indicative of output beam power) with a laser tube power level request signal, in a manner to be described in greater detail below with reference to FIG. 3. When the beam output signal (from amplifier 46) exceeds the tube power level request signal, light regulator 6 asserts a control signal (through a fiber optic link which connects circuits 6 and 8) to switch control circuit 8, to cause circuit 8 to switch off the switching transistor Q1. When transistor Q1 is switched off, the current through tube 2 (which flows from tube 2 through free-wheeling diode D12 and switching inductor L5) decreases, as stored energy in inductor L5 is transferred to laser tube 2. The power in output beam 3 correspondingly decreases.

Current sensing resistor R8 also supplies a feedback signal to control circuit 8 (to tube current amplifier 80 within circuit 8, to be described below with reference to FIGS. 2 and 8A). The feedback signal is indicative of the current through resistor R8. When the feedback signal indicates that this current exceeds a maximum predetermined value, circuit 8 will switch off switching transistor Q1. This current limiting operation is independent from the above-described operation in which circuit 8 switches off transistor Q1 in response to control signals (from circuit 6) generated by the above-mentioned comparator within circuit 6.

Timing circuitry within control circuit 8 turns transistor Q1 back on (following a selected minimum delay period) each time after it is switched off, until termination of the laser pulse in response to termination of the laser tube power level request signal supplied to circuit 6 (and in response to receipt at circuit 6 of an "end of exposure" command, such as from user-operated foot switch 7 shown in FIG. 3). During the laser pulse, the tube current will cyclically increase and decrease (so that a graph of the tube currents will have a rippled appearance, as do FIGS. 4B and 5A, the graphs labeled "laser current v. time" in FIGS. 4 and 5).

The top graph in FIG. 4 (FIG. 4A, labeled "starter voltage v. time") represents a short duration starter voltage pulse (having a maximum amplitude of 2000 volts) asserted by tube pulse starter 81 at time T0, to initiate generation of a laser output pulse. If switching transistor Q1 is also switched on at time T0, the FIG. 1 system can be controlled to supply current through tube 2 having the amplitude shown in the middle graph in FIG. 4 (FIG. 4B, labeled "laser current v. time"), so as to generate a laser output beam 3 having power as shown in the bottom graph in FIG. 4 (FIG. 4C, labeled "laser light output v. time").

As is typical when the inventive apparatus is employed to power an argon ion laser, the laser beam power does not begin to increase (above zero) until time TI, after the time T0 when the apparatus receives a command to produce full current flow in laser tube 2. After time T1, the laser tube current and the laser output beam power typically increase gradually for several milliseconds (until time T2) until the output beam power reaches a level (the "overshoot level" in FIG. 4C) which significantly exceeds the desired power level. This "overshoot" phenomenon is undesirable for ophthalmic applications because it complicates determination of the power and energy delivered per pulse. It is an important aspect of the invention to control the current through the laser tube (in a manner to be described below with reference to FIG. 5) to avoid overshoot, and thus to generate a laser output beam having power as shown in FIG. 5.

The ripple amplitude in the laser beam power is a function of the switching inductance (i.e., the inductance of inductor L5, which is connected in series with transistor Q1 and the cathode of tube 2) and the switching frequency. A large inductance value will reduce ripple, but will increase pulse rise and fall times, and the required inductor will be large, heavy, and expensive. Furthermore, high switching frequency increases the switching loss in the semiconductor devices employed.

The FIG. 1 system includes DC power supply 64, which receives standard, 115-120 volt, AC power from a wall outlet. Circuit 64 charges energy storage capacitor bank 74, thereby developing a DC potential difference, (B+) −( B−), for application across laser tube 2 and the laser control system previously described.

Figure 2:
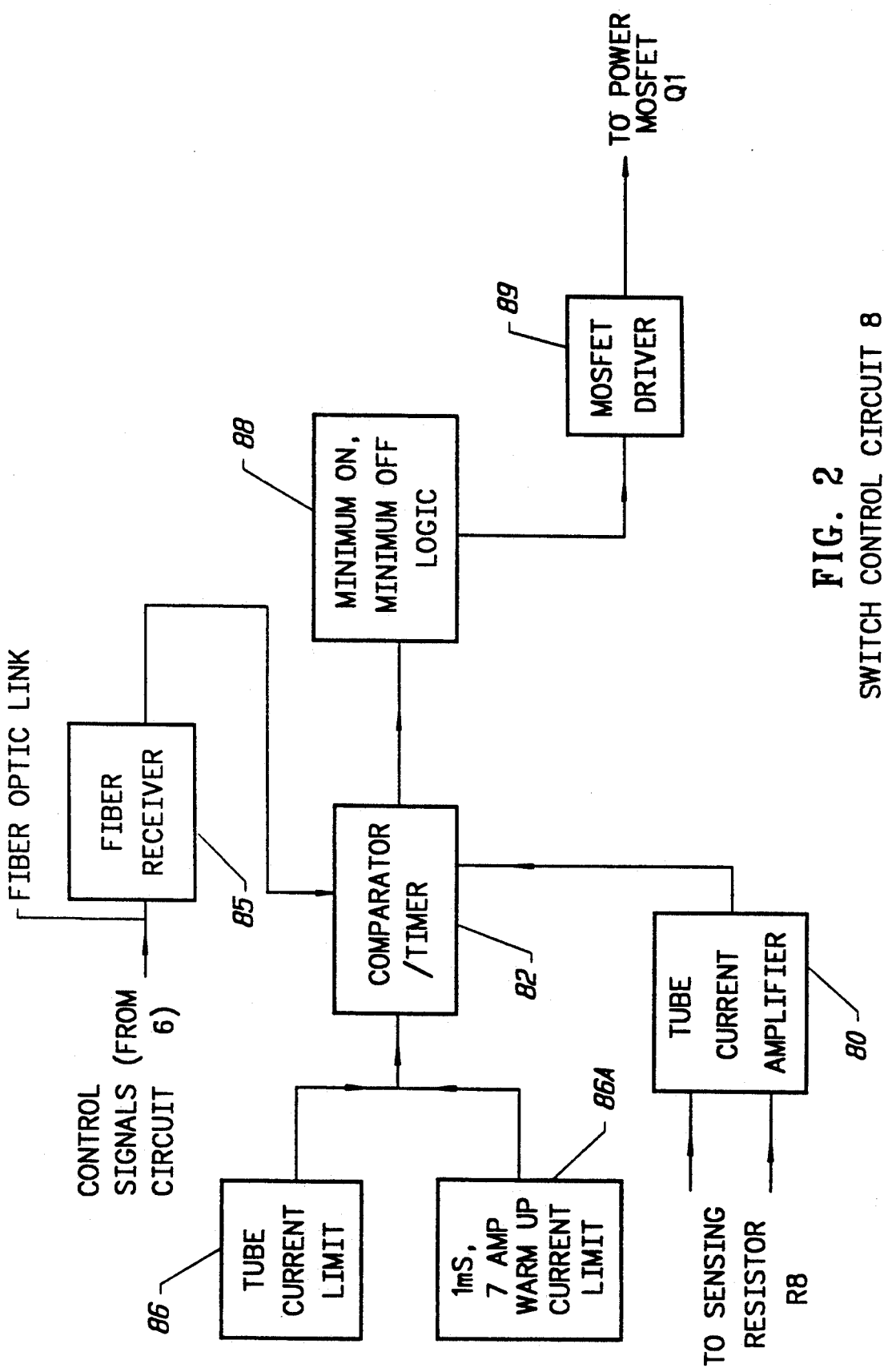
FIG. 2 is a block diagram of the switch control unit of the FIG. 1 embodiment.

FIG. 2 is a block diagram of a preferred embodiment of switch control circuit 8 of FIG. 1. In FIG. 2, fiber optic receiver circuit 85 receives control signals (in the form of electromagnetic radiation pulses) that have been transmitted from circuit 6 over a fiber optic link. Circuit 85 (a preferred embodiment of which is shown in FIG. 8A) converts the control signals into digital electrical signals, and supplies the digital signals to current comparator and timer circuit 82 (a preferred embodiment of which is shown partially in FIG. 8A and partially in FIG. 8A).

Tube current amplifier circuit 80/ (a preferred embodiment of which is shown in FIG. 8A) receives and amplifies tube current feedback signals IS+ and IS− (which are indicative of the sense and amplitude of the current through resistor R8), and supplies them to current comparator and timer circuit 82. When the measured tube current exceeds a maximum predetermined value determined by tube current limit control circuit 86 (a preferred embodiment of which is shown in FIG. 8A), circuit 82 asserts a control signal which causes switching transistor driver 89 (a preferred embodiment of which is shown in FIG. 8B) to switch off the switching transistor Q1. This prevents component damage in the event that the laser cannot provide sufficient light to increase the amplified photocell output signal from circuit 46 up to the laser tube power request value (asserted at the output of D-to-A converter 100 of FIG. 3) within the available current range. Preferably, tube current limit control circuit 86 includes a means (identified as separate block 86a in FIG. 2, but preferably included within circuit 86) for asserting to circuit 82 a special warmup tube current limit (e.g., a seven amp limit) for a selected period (e.g., one millisecond) after receipt of each laser output pulse request.

"Minimum on time/minimum off time logic" circuitry 88 prevents driver circuit 89 from turning transistor Q1 back on until after a selected minimum delay period each time after it is switched off, and prevents driver circuit 89 from turning transistor Q1 off until after a selected minimum delay period each time after it is switched on, until termination of a desired laser pulse. A variety of timing techniques can be implemented within circuit 88 (or within circuits 82 and 88), such as constant frequency, hysteretic, and constant on and off time techniques. The preferred embodiment of circuitry 88 of FIG. 8B consists of portions 88a and 88b. In FIG. 8B, circuit 88a implements a minimum "Q1 off" period of 20 microseconds each time after Q1 is switched off, and circuit 88b implements a minimum "Q1 on" period of 10 microseconds each time after Q1 is switched on.

The minimum delay periods (the periods "Q1 off" and "Q1 on") prevent excessive switching losses during operation of the inventive apparatus, and provide sufficient time for snubber circuit 95 connected to transistor Q1 to complete its operating cycles. As shown in FIG. 8B, snubber circuit 95 (not shown in FIG. I for simplicity) is preferably connected to transistor Q1, to provide immunity from voltage and current spikes which may otherwise be produced during switching of load current during operation of the inventive apparatus.

The FIG. 2 embodiment of switch control circuit 8 regulates on the peaks of the light waveform when running in the constant off time (normal) mode, and regulates on the valleys (representing minimum light) in a constant on time mode.

Next, with reference to FIG. 3, a preferred embodiment of light regulation circuit 6 will be described. In FIG. 3, digital computer 5 (not shown in FIG. 1) asserts a laser tube power request signal (indicating a desired laser output beam power) to digital-to-analog converter 100 within circuit 6. Computer 5 (or user-operated foot switch 7) asserts an "end of exposure" control signal (whose transitions represent start and end times of each desired laser pulse) to end of exposure receiver circuit 102 within circuit 6.

The beam output signal (described above with reference to FIG. 1) from amplifier 46 is supplied to a first input of comparator 112 within circuit 6. An integrating circuit comprising integrating amplifier 110 and integrating capacitor 109 (a 0.01 microfarad capacitor in FIG. 3) is provided to reduce regulation error by providing an averaged version of the beam power signal from amplifier 46 to comparator 112, rather than the beam power signal itself (the latter is a rippled or "sawtoothed" signal which follows the instantaneous output beam power). The signal asserted at the output of the integrating circuit is supplied to a second input of comparator 112, and is thus indicative of averaged (rather than instantaneous) output beam power.

One input of integrating amplifier 110 (for receiving a signal proportional to the output beam power signal) is connected by a 100 kiloohm resistor to amplifier 46, and the other input of amplifier 110 receives the analog laser tube power request signal output from circuit 100 (which latter signal represents desired laser output beam power).

Power switch 114 receives the output of comparator 112, and generates switch control signals therefrom for transmission to circuit 8 (over a fiber optic link). The switch control signals are employed to turn off transistor Q1 (shown in FIG. I) when the average (integrated) measured beam power exceeds the level specified by the power request signal from D-to-A converter 100, and to turn on transistor Q1 when the average measured beam power is less than the level specified by the power request signal.

Logic circuitry 106 monitors the output of circuit 114, and generates (and asserts to switch control circuit 104) a control signal for triggering the opening or closing of analog switch 108 upon assertion of a desired switch control signal by circuit 114.

Integrating capacitor 109 is discharged by closing analog switch 108 under the control of switch control circuit 104. Preferably, switch 108 is closed when the "end of exposure" signal from circuit 102 indicates initiation of a laser pulse. Preferably switch 108 is kept closed until light regulation is established (to avoid integrating error voltages which may occur prior to establishment of light regulation). Specifically, the latter can be accomplished with circuitry 106 which generates a control signal for opening switch 108 when the output of circuit 114 indicates that light regulation has been established.

Alternatively, the charging current from integrating capacitor 109 can be disconnected between light pulses, until light regulation is established. This embodiment is preferable for repeated pulse operation of the inventive laser system, since the integrating circuit in this embodiment would always hold the correction used on the last laser pulse.

Next, with reference to FIGS. 4 and 5 (FIG. 5B), we describe the manner in which current through laser tube 2 should be controlled to avoid the overshoot phenomenon described above with reference to FIG. 4, to generate a laser output beam having power as shown in the bottom graph of FIG. 5 (FIG. 5B). If the switching transistor Q1 is switched on at time T0, the laser output beam power (represented by the bottom graph of FIG. 4) typically increases gradually for several milliseconds (from time T1 until time T2) to the "overshoot level" which significantly exceeds the desired power level. This undesirable "overshoot" phenomenon occurs when the laser efficiency increases at a higher rate than current through the laser tube decreases, which can occur due to redistribution of gas in the laser tube during the starting interval (gas is heated and pumped by the electrical energy delivered to the laser tube, and several milliseconds are required for the gas to reach equilibrium within the tube).

The overshoot phenomenon can be greatly reduced by controlling the inventive apparatus to perform the following sequence of steps to initiate each laser pulse:

1. initially, the laser magnet is turned on (e.g., magnet regulator 84 activates tube magnet 2a);
2. after a time delay to allow the magnetic field to build up fully, high voltage is applied to the laser tube to ionize gas therein (e.g., starter 81 applies a high voltage pulse to ionize laser gas within tube 2);
3. laser current is allowed to build up to a regulated value below the lasing threshold (e.g., the laser tube power request to circuit 6 is maintained at a value representing a seven amp tube current, which is below the lasing threshold); and
4. after a delay sufficient to allow redistribution of the laser gas, the laser current is allowed to increase above the lasing threshold at a controlled rate until light regulation is achieved.

We next provide an example illustrating how the inventive apparatus can implement these four steps to generate a laser output beam having the power shown in the bottom graph of FIG. 5 (FIG. 5B). In this example, magnet regulator 84 initially activates magnet 2a in response to a "magnet on" control signal which it receives over a fiber optic link. Then, at time T0 (after a time delay to allow the magnetic field to build up fully), switching transistor Q1 is switched on, starter 81 applies a high voltage pulse to laser tube 2 to ionize gas therein, and a laser tube power request representing a seven amp tube current (below the lasing threshold) is asserted to circuit 6. The laser current through tube 2 builds up until it reaches about seven amps (at time TI), at which time circuits 82 and 86 (described above with reference to FIG. 8A) commence to regulate the laser current at seven amps. Then, at time T2 (after a delay sufficient to allow redistribution of laser gas in tube 2), the laser tube power request level is increased to allow the laser current to increase above the lasing threshold at a controlled rate (determined by resistors R117 and R118 and capacitor C57) until light regulation at the requested power level is achieved at time T4. The laser current reaches the lasing threshold at time T3 (between times T2 and T4). The interval between times T2 and T4 is typically on the order of one millisecond.

Figure 6:
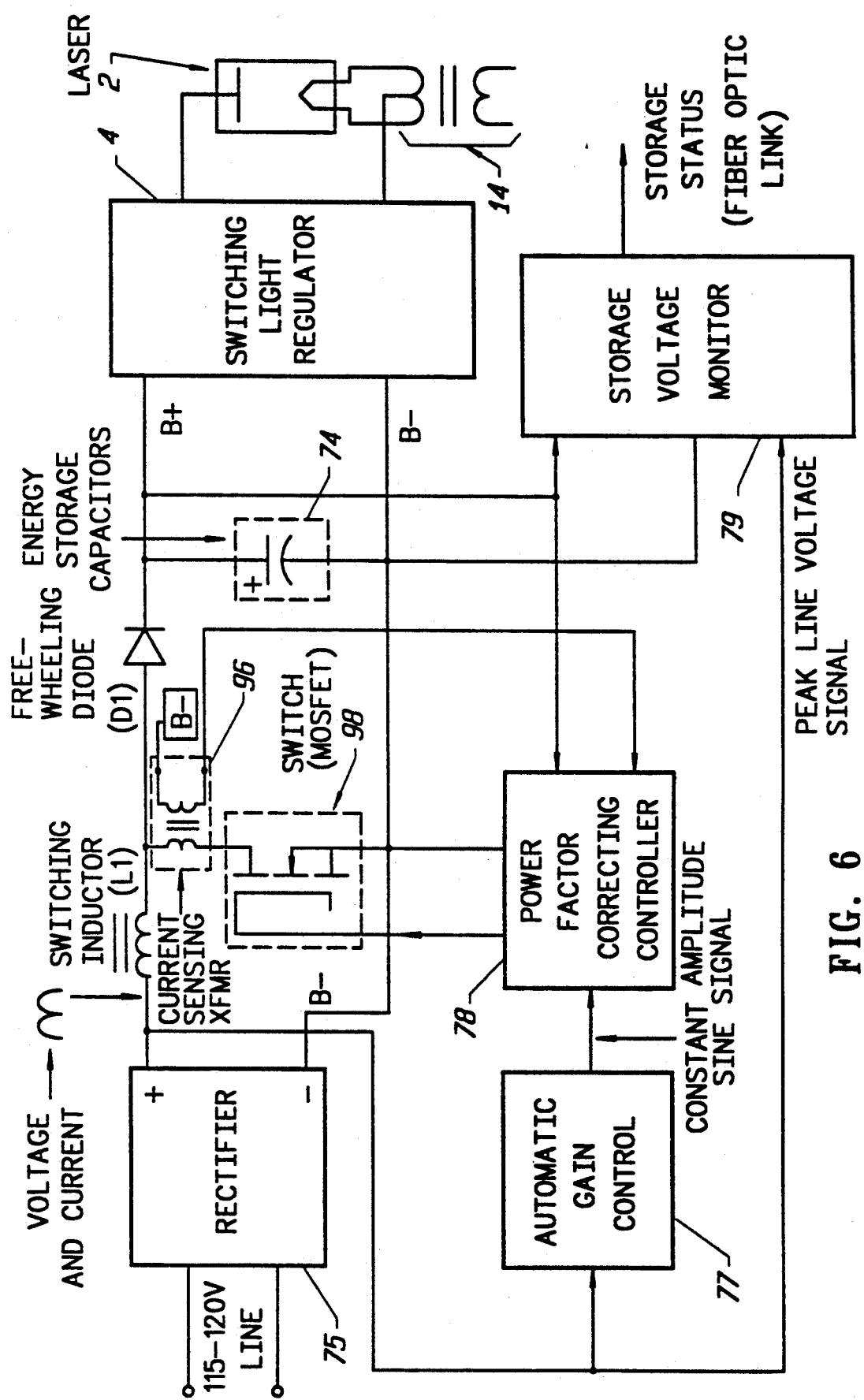
FIG. 6 is a block diagram of a preferred embodiment of a portion of the FIG. 1 system.
Figure 7:
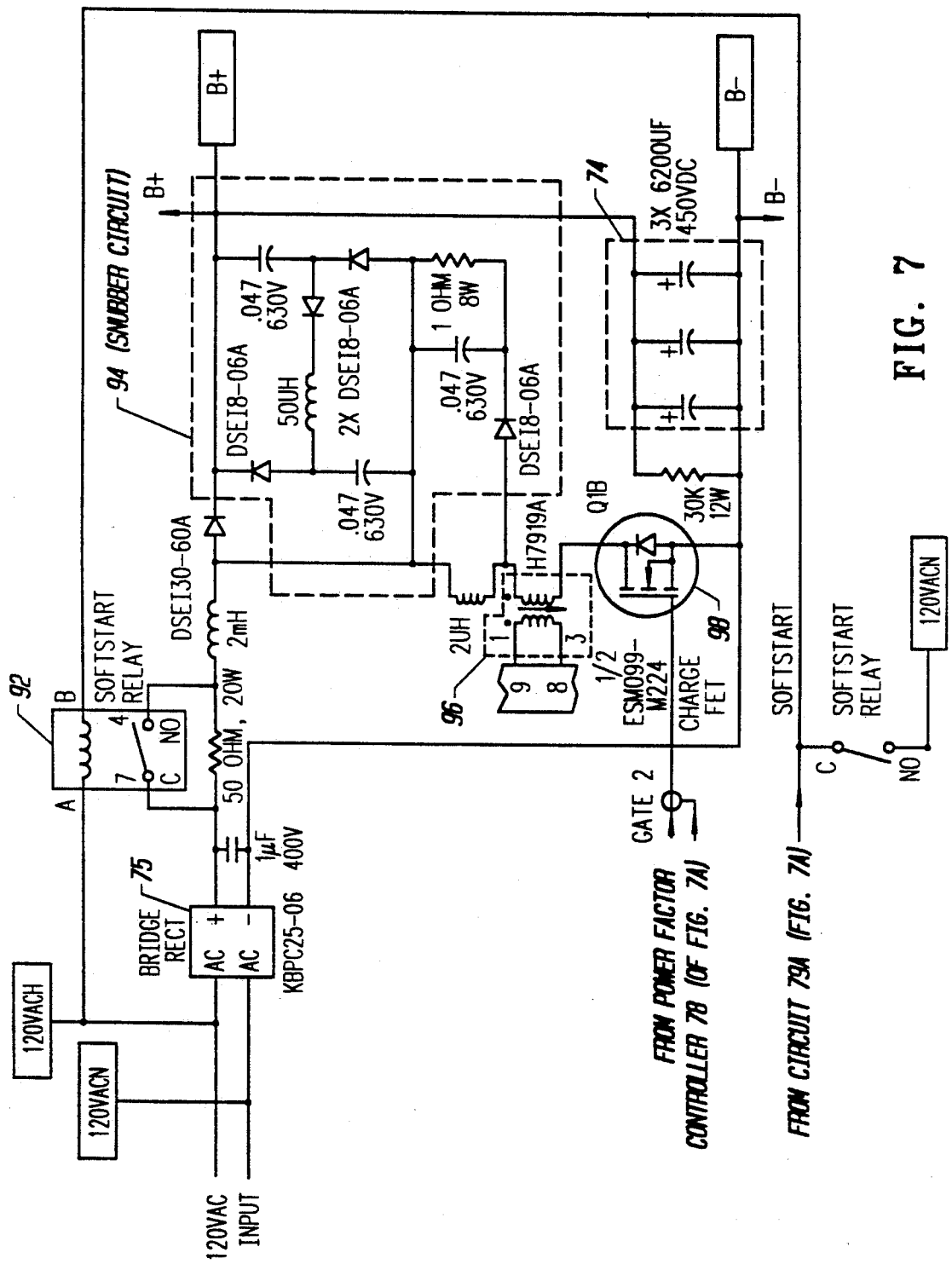
FIG. 7 is a schematic diagram of a preferred implementation of a first portion of the FIG. 1 system.

A preferred embodiment of charging power supply circuit 64 of FIG. I will next be described with reference to FIGS. 6, 7, and 7A. Each of FIGS. 7 and 7A is a schematic diagram of a preferred embodiment of a different portion of the FIG. 6 circuitry. As shown in FIGS. 6 and 7, circuit 64 includes rectifier 75 for rectifying standard 115-120 VAC power (i.e., standard line power from a wall outlet). The rectified AC output of circuit 75 flows through switching inductor L1 and free-wheeling diode D1 to charge the energy storage capacitors identified as capacitor storage bank 74. The voltage, (B+)−(B−), developed across capacitor bank 74 is applied across "switching light regulator" circuitry 4 (which comprises elements R8, Q1, D16, D12, 81, and L5 of FIG. 1), which in turn supplies current to laser tube 2 in the manner described above.

Charging power supply 64 embodies a "boost" switching topology, which employs power factor correcting control circuit 78 to draw sinusoidal line current in phase with line voltage, thus maximizing the power available from the line without exceeding the current rating of the line receptacle.

The voltage B+ must be maintained above the peak line voltage (e.g., 170 VDC for a 120 volt line) for proper operation of power factor controller 78. Capacitor storage bank 74 is charged between laser pulses to the maximum safe value. In the FIG. 7 embodiment, capacitor storage bank 74 consists of three 6200 microfarad capacitors which are connected in parallel (and 450 volt rated), and charged to 400 volts between laser pulses.

The FIG. 6 apparatus operates in a line current regulation mode during each laser pulse, and while recharging capacitor storage bank 74 after a laser pulse.

Power factor controller 78 (a preferred embodiment of which is shown in FIG. 7A) forces line current to be proportional to instantaneous line voltage, which results in maximum power transfer to capacitor bank 74. Available RMS line current is proportional to RMS line voltage, so that the available power would thus vary with the square of the RMS line voltage except for the action of the circuit to be described.

The rectified output of circuit 75 is also supplied to automatic gain control circuit 77 (a preferred embodiment of which is shown in FIG. 7A). AGC circuit 77 outputs a full wave rectified sine wave (having a constant peak amplitude) to power factor controller 78, to limit the RMS line current to a constant value (determined by the receptacle current rating) regardless of variation in the line voltage.

When capacitor storage bank 74 is fully charged, switching transistor 98 and power factor controller 78 (which asserts a control signal to the gate of switching transistor 98) operate to provide intermittent small current pulses to bank 74, in order to maintain the storage capacitors within bank 74 at full voltage until commencement of the next light pulse.

Charging current sensing transformer 96 supplies signal "CHG ISENSE" (indicative of current flow through the source and drain of transistor 98) to power factor controller 78.

Storage voltage monitor circuitry 79 provides an output signal indicative of the storage status of bank 74.

Snubber circuit 94 is preferably connected as shown in FIG. 7 to transistor 98 and current sensing transformer 96, to provide immunity from voltage and current spikes which may otherwise be produced during switching of load current during operation of the inventive apparatus.

The circuitry of FIGS. 7 and 7A (i.e., "Softstart" control circuitry within block 79 of FIG. 7A, "Softstart" relay driver 79A of FIG. 7A, and switch 92 of FIG. 7 which is controlled by relay driver 79A) implements a "Softstart" operating mode by utilizing resistor R3 upon initial turn on of line power to charging power supply 64, to limit line power inrush. When the B+, B− voltage reaches approximately 90% of the peak rectified line voltage, driver 79A closes switch 92 to terminate the "Softstart" mode (and bypass 50 ohm resistor R3 across which switch 92 is connected).

As shown in FIG. 7A, circuit 64 preferably also includes circuitry for developing the DC voltage, (B− +15 Volts), for powering other circuit components within circuit 64.

In FIG. 8B, crowbar circuit 97 (which includes SCR1) provides a very fast shutdown of laser tube 2 by enabling a low impedance path for current in parallel with the tube in response to signals SCR+ and SCR−. Upon occurrence of an undesired system operating condition (as determined by one or more detectors, not shown in the FIGS.) signals SCR+ and SCR− will enable crowbar circuit 97, to shunt the tube current through circuit 97 and around laser tube 2 (so that the tube will deionize).

Figure 9:
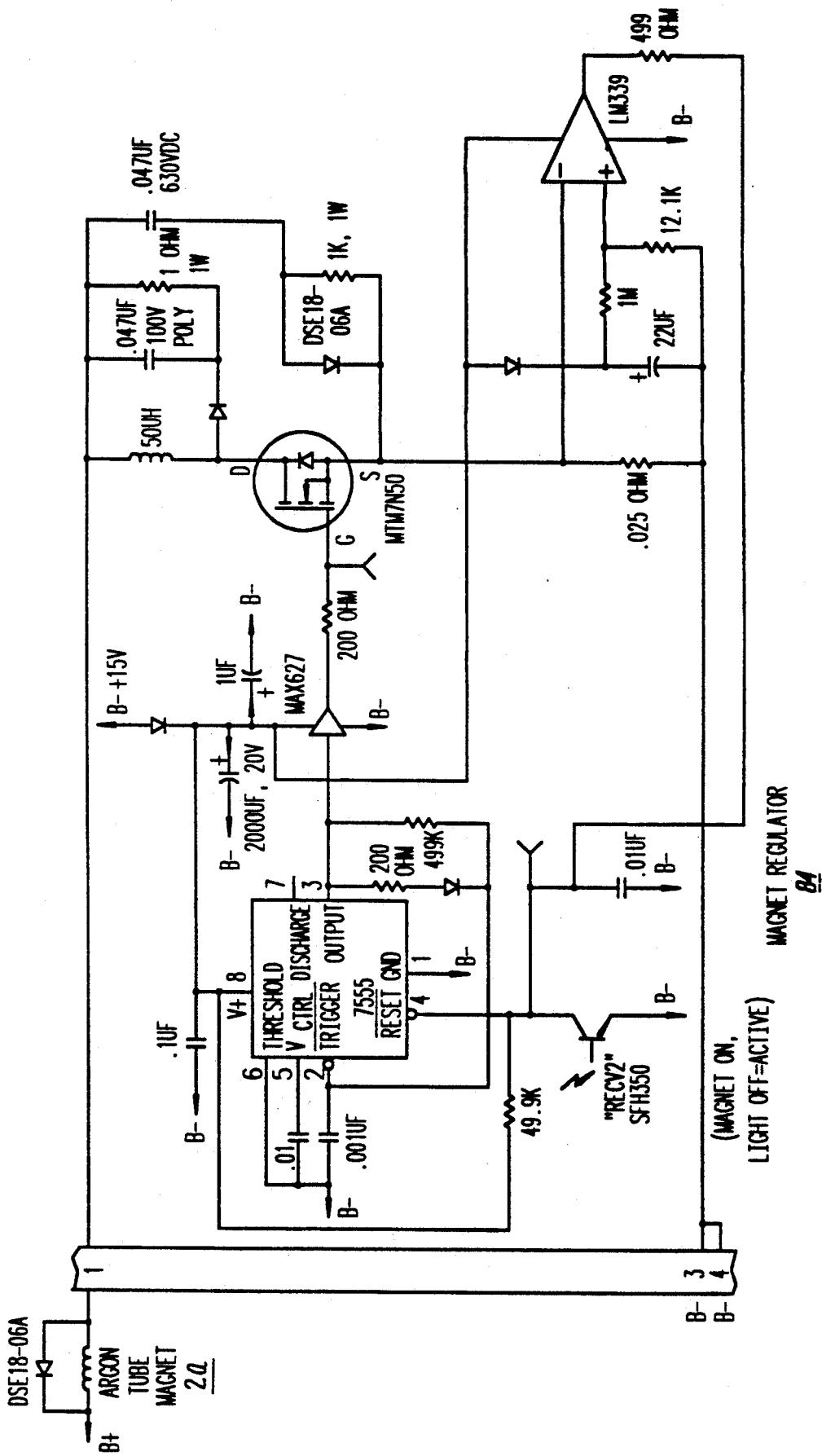
FIG. 9 is a schematic diagram of a preferred implementation of magnet regulator circuit 84 of the FIG. 1 system.

Next, with reference to FIG. 9, we describe a preferred embodiment of magnet regulator circuit 84, which disables laser tube magnet 2a in the absence of a "magnet on" control signal (identified as "RECV2" in FIG. 9) received at the base of transistor J38 from a fiber optic link. Upon reception of the "magnet on" control signal, magnet regulator 84 activates tube magnet 2a (by switching on transistor Q9 to enable current flow through magnet 2a between the B+ and B− terminals of capacitor storage bank 74). Tube magnet 2a, connected directly to the B+ terminal of storage bank 74, is turned off at the end of the exposure.

The preferred embodiment of the invention described above with reference to FIGS. 1-9 is capable of delivering laser beam pulses having power in the range from 50 mW to 2 W, and duration in the range from 0.01 sec. to 2 sec. The apparatus employs rectification circuitry and energy storage capacitors having a total capacitance of about 19 mF to convert standard 115-120 VAC power (having maximum line power of about 1545 watts) from a wall outlet to the DC electrical power (in the range from about 1500 to 6000 watts) required during generation of each laser pulse. The energy storage capacitors typically charge to 400 volts, and discharge to about 170 volts. The apparatus is suitable for generating controlled laser pulses using a ceramic/tungsten argon laser tube having lasing threshold power of 1000 watts, and magnet power of 750 watts.

The need to recharge the energy storage capacitors between laser pulses limits the achievable laser pulse repetition rate. During a laser pulse, maximum allowable power is drawn from the line and used with stored energy from the capacitors. When the laser pulse is turned off, maximum line power is used to recharge the capacitors. A new pulse cannot be started until the capacitors are fully charged.

Figure 10:
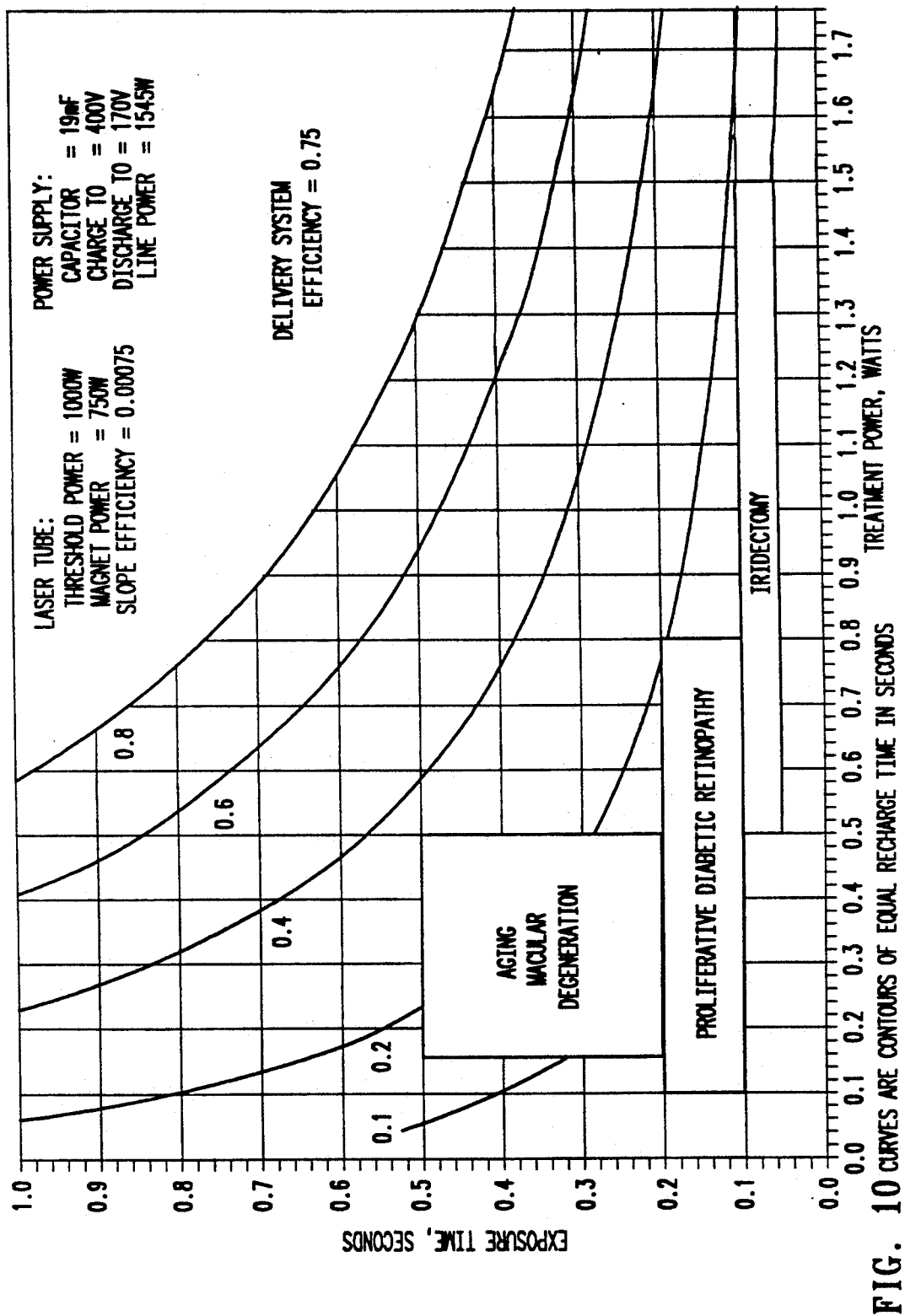
FIG. 10 is a graph representing typical ranges of laser pulse duration and laser beam power produced by the inventive system, and typical capacitor charging times needed to generate laser beam pulses of desired duration and beam power using the inventive system.

FIG. 10 represents typical ranges of laser pulse duration and laser beam power that can be produced by the above-described preferred embodiment of the invention for several types of ophthalmic surgical applications, and typical capacitor charging times needed to generate laser beam pulses of desired duration and beam power. For example, FIG. 10 indicates that the apparatus requires about 0.2 seconds to recharge its storage capacitors following generation of a laser pulse of duration 0.19 seconds and power 0.8 watts (for example, for treatment of proliferative diabetic retinopathy).

Various modifications and alterations in the structure and method of operation of this invention will be apparent to those skilled in the art without departing from the scope and spirit of this invention. Although the invention has been described in connection with specific preferred embodiments, it should be understood that the invention as claimed should not be unduly limited to such specific embodiments.

What is claimed is:

1. A power supply for a laser, including;
   a capacitor means;
   a charging power supply which receives standard AC power, wherein the standard AC power has current and voltage ratings which limit said standard AC power to a power value substantially less than that required by the laser, the charging power supply further including means for charging the capacitor means with the standard AC power;
   capacitor discharge circuitry for performing controlled discharging of the capacitor means to generate a laser input pulse having controlled duration and amplitude; and
   means for applying the laser input pulse to the laser, thereby causing the laser to generate a pulsed laser output beam having controlled power and duration, wherein during the controlled discharging of the capacitor means, the laser input pulse has power substantially in excess of said power value.

2. The power supply of claim 1, wherein the laser input pulse has power substantially above 6000 watts.

3. A power supply for a laser, including:
   a capacitor means;
   a charging power supply which receives standard AC power, and includes means for charging the capacitor means with the standard AC power;
   capacitor discharge circuitry for performing controlled discharging of the capacitor means to generate a laser input pulse having controlled duration and amplitude; and
   means for applying the laser input pulse to the laser, thereby causing the laser to generate a pulsed laser output beam, wherein the pulsed laser output beam has controlled power in the range from 50 milliwatts to 2 watts, and controlled duration in the range from 0.01 second to 2 seconds.

4. A power supply for a laser having a laser gas tube and a tube magnet, the power supply including:
   a capacitor means;
   a charging power supply which receives standard AC power, and includes means for charging the capacitor means with the standard AC power;
   capacitor discharge circuitry for performing controlled discharging of the capacitor means to generate a laser input pulse having controlled duration and amplitude;
   means for applying the laser input pulse across the laser gas tube, thereby causing the laser to generate a pulsed laser output beam having controlled power and duration; and
   a magnet control circuit which enables the laser tube magnet in the absence of a magnet control signal received at the magnet control circuit from a fiber optic link, in order to promptly discharge energy stored in the power supply when said power supply is turned off.

5. A power supply for a laser, including:
   a capacitor means;
   a charging power supply which receives standard AC power, and includes means for charging the capacitor means with the standard AC power;
   capacitor discharge circuitry for performing controlled discharging of the capacitor means to generate a laser input pulse having controlled duration and amplitude, wherein the capacitor discharge circuitry includes:

a switching transistor, inductor, and diodes; and a switch control circuit for sequentially turning the switching transistor on and off, thereby causing the capacitor discharge circuitry to generate a laser current pulse having controlled duration, average amplitude, and ripple amplitude; and means for applying the laser input pulse to the laser, thereby causing the laser to generate a pulsed laser output beam having controlled power and duration.

6. The power supply of claim 5, also including:

means for monitoring the laser output beam to generate a feedback signal indicative of power of the laser output beam;

and wherein the capacitor discharge circuitry includes a light regulator circuit, including:

means for receiving and comparing the feedback signal and an externally generated signal indicative of a requested laser power level; and means for asserting a control signal to the switch control circuit to cause the switch control circuit to turn off the switching transistor when the power of the laser output beam exceeds the requested laser power level, and to cause the switch control circuit to turn on the switching transistor when the power of the requested laser power level is less than the power of the laser output beam.

7. The power supply of claim 5, wherein the capacitor discharge circuitry also includes:

inductor and diode means through which current flows when the switching transistor is turned off, thereby decreasing the current through the laser.

8. The power supply of claim 5, also including:

means for generating a current signal indicative of current flow to the laser; and wherein the switch control circuit includes means for generating a control for turning off the switching transistor when the current signal indicates that the current flow to the laser exceeds a maximum predetermined current.

9. A power supply for a laser including:

a capacitor storage bank having capacitance substantially equal to 18,600 microfarads;

a charging power supply which receives standard AC power, and includes means for charging the capacitor storage bank with the standard AC power;

capacitor discharge circuitry for performing controlled discharging of the capacitor storage bank to generate a laser input pulse having controlled duration and amplitude; and means for applying the laser input pulse to the laser, thereby causing the laser to generate a pulsed laser output beam having controlled power and duration.

10. An electronically pulsed gas laser system, including:

a laser having a laser gas tube;

a capacitor means;

a charging power supply which receives standard AC power, wherein the standard AC power has current and voltage ratings which limit said standard AC power to a power value substantially less than that required by the laser, the charging power supply including means for charging the capacitor means with the standard AC power;

capacitor discharge circuitry for performing controlled discharging of the capacitor means to generate a laser input pulse having controlled duration and amplitude; and means for applying the laser input pulse to the laser gas tube, thereby causing the laser to generate a pulsed laser output beam having controlled power and duration wherein during the controlled discharging of the capacitor means, the laser input pulse has power substantially in excess of said power value.

11. The system of claim 10, wherein the laser input pulse has power substantially above 6000 watts.

12. An electronically pulsed gas laser system, including:

a laser having a laser gas tube;

a capacitor means;

a charging power supply which receives standard AC power, and includes means for charging the capacitor means with the standard AC power;

capacitor discharge circuitry for performing controlled discharging of the capacitor means to generate a laser input pulse having controlled duration and amplitude; and means for applying the laser input pulse to the laser gas tube, thereby causing the laser to generate a pulsed laser output beam having controlled power in the range from 50 milliwatts to 2 watts, and controlled duration in the range from 0.01 second to 2 seconds.

13. An electronically pulsed gas laser system, including:

a laser having a laser gas tube and a tube magnet;

a capacitor means;

a charging power supply which receives standard AC power, and includes means for charging the capacitor means with the standard AC power;

capacitor discharge circuitry for performing controlled discharging of the capacitor means to generate a laser input pulse having controlled duration and amplitude; and means for applying the laser input pulse to the laser gas tube, thereby causing the laser to generate a pulsed laser output beam having controlled power and duration; and a magnet control circuit which enables the laser tube magnet in the absence of a magnet control signal received at the magnet control circuit from a fiber optic link, in order to promptly discharge energy stored in the system when the system is turned off.

14. An electronically pulsed gas laser system, including:

a laser having a laser gas tube;

a capacitor means;

a charging power supply which receives standard AC power and includes means for charging the capacitor means with the standard AC power;

capacitor discharge circuitry for performing controlled discharging of the capacitor means to generate a laser input pulse having controlled duration and amplitude, wherein the capacitor discharge circuitry includes:

a switching transistor; and a switch control circuit for sequentially turning the switching transistor on and off, thereby causing the capacitor discharge circuitry to generate a current pulse having controlled duration, average amplitude, and ripple amplitude; and means for applying the laser input pulse to the laser gas tube, thereby causing the laser to generate a pulsed laser output beam having controlled power and duration.

15. A method for supplying power to a laser having a laser gas tube, a tube magnet, and a magnet control circuit for selectively enabling the tube magnet, including the steps of:
   (a) charging a capacitor means with standard AC power;
   (b) after step (a), discharging the capacitor means in controlled manner to generate a current pulse having controlled duration and amplitude; and
   (c) applying the current pulse across the laser gas tube, thereby causing the laser to generate a pulsed laser output beam having controlled power and duration; and
   enabling the laser tube magnet in the absence of a magnet control signal received at the magnet control circuit from a fiber optic link.

16. A method for supplying power to a laser, including the steps of:
   (a) charging a capacitor means with standard AC power;
   (b) after step (a), discharging the capacitor means by sequentially turning a switching transistor on and off, thereby generating a current pulse having controlled duration, average amplitude, and ripple amplitude; and
   (c) applying the current pulse to the laser, thereby causing the laser to generate a pulsed laser output beam having controlled power and duration, wherein step (b) also includes the steps of:
   monitoring the laser output beam to generate a feedback signal indicative of power of the laser output beam;
   comparing the feedback signal with an externally generated signal indicative of a requested laser power level; and
   turning off the switching transistor when the power of the laser output beam exceeds the requested laser power travel level, and turning on the switching transistor when the power of the requested laser power level exceeds the power of the laser output beam.

17. A method for supplying power to a gas laser, wherein the gas laser includes a laser gas tube having a lasing threshold current, and a tube magnet, including the steps of:
   activating the tube magnet to produce a magnetic field in the laser gas tube;
   after a time delay sufficient to allow the magnetic field to build up fully, applying a high voltage to the laser gas tube to ionize gas therein;
   causing an increasing current flow through the laser gas tube, up to a current level below the lasing threshold current; and
   after a delay sufficient to allow redistribution of laser gas within the laser gas tube, further increasing the current flow, through the laser gas tube in a controlled manner, to a level above the lasing threshold current, thereby causing the laser to emit a beam having a regulated power.

18. The method of claim 17, wherein the current flow through the laser gas tube is regulated by discharging a capacitor means in controlled manner to generate a current pulse having controlled amplitude and applying the current pulse to the laser gas tube.

19. The method of claim 18, wherein the step of discharging the capacitor means in controlled manner includes the step of:
   sequentially turning a switch on and off, thereby generating a current pulse having controlled duration, average amplitude, and ripple amplitude.

20. The method of claim 19, wherein the step of discharging the capacitor means in controlled manner includes the steps of:
   monitoring the beam to generate a feedback signal indicative of power of said beam;
   comparing the feedback signal with an externally generated signal indicative of a requested laser power level; and
   turning off the switch when the power of the beam exceeds the requested laser power level, and turning on the switch when the power of the requested laser power level is less than the power of the beam.

21. The method of claim 19, wherein the step of discharging the capacitor means in controlled manner includes the steps of:
   (a) generating a current signal indicative of current flow to the laser; and
   (b) turning off the switch when the current signal indicates that the current flow to the laser exceeds a maximum predetermined current.

22. The method of claim 21, wherein the step of discharging the capacitor means in controlled manner also includes the steps of:
   (c) a predetermined minimum delay time after step (b), turning on the switch; and
   (d) repeating steps (b) and (c).

* * * * *